US012799378B2

(12) United States Patent
Jeng et al.

(10) Patent No.: US 12,799,378 B2
(45) Date of Patent: Nov. 17, 2026

(54) ADHESIVE AND MULTILAYER STRUCTURE

(71) Applicant: INDUSTRIAL TECHNOLOGY RESEARCH INSTITUTE, Hsinchu (TW)

(72) Inventors: Jauder Jeng, Zhudong Township (TW); Yuan-Chang Huang, Taichung City (TW); Kuan-Wei Chen, Zhudong Township (TW); Jheng-Ying Li, Taoyuan City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 127 days.

(21) Appl. No.: 18/811,252

(22) Filed: Aug. 21, 2024

(65) Prior Publication Data

US 2025/0215292 A1 Jul. 3, 2025

(30) Foreign Application Priority Data

Dec. 29, 2023 (TW) ................................ 112151578

(51) Int. Cl.
*C09J 179/08* (2006.01)

(52) U.S. Cl.
CPC .................................. *C09J 179/08* (2013.01)

(58) Field of Classification Search
CPC ....... C09J 179/08; C09J 7/20; C08G 73/1042; C08G 73/1071
See application file for complete search history.

(56) References Cited

U.S. PATENT DOCUMENTS 9,138,692 B2 9/2015 Liu et al.
9,296,925 B2 3/2016 Wakayama et al.
(Continued)

FOREIGN PATENT DOCUMENTS

CN 101003716 A 7/2007
CN 107635772 A 1/2018
(Continued)

OTHER PUBLICATIONS

Japanese Office Action for Japanese Application No. 2024-201658, dated Nov. 4, 2025, with English translation.
(Continued)

*Primary Examiner* — Christopher W Raimund
(74) *Attorney, Agent, or Firm* — Birch, Stewart, Kolasch & Birch, LLP

(57) ABSTRACT

An adhesive and multilayer structure are provided. The adhesive includes a polyimide, wherein the polyimide is a reaction product of a reactant (a) and a reactant (b). The reactant (a) is a first diamine or the reactant (a) includes of a first diamine and a second diamine, and the reactant (b) includes of a first dianhydride and a second dianhydride. The first diamine is a diphenyl-ether-moiety-containing diamine, the first dianhydride is a diphenyl-ether-moiety-containing dianhydride, the second diamine is not a diphenyl-ether-moiety-containing diamine, and the second dianhydride is not a diphenyl-ether-moiety-containing dianhydride. The total weight percentage of the first diamine and the first dianhydride is 55 wt % to 94 wt %, based on the total weight of the reactant (a) and the reactant (b).

12 Claims, 1 Drawing Sheet

(56) References Cited

U.S. PATENT DOCUMENTS

| | | | |
|---|---|---|---|
| 9,868,823 | B2 | 1/2018 | Katayama et al. |
| 9,873,767 | B2 | 1/2018 | Sato |
| 10,050,005 | B2 | 8/2018 | Kanamori et al. |
| 10,557,003 | B2 | 2/2020 | Suenaga et al. |
| 10,647,883 | B2 | 5/2020 | Yum et al. |
| 11,492,519 | B2 | 11/2022 | Lee et al. |
| 2009/0023747 | A1 | 1/2009 | Tickle et al. |
| 2015/0093879 | A1 | 4/2015 | Fujimaki et al. |
| 2016/0075922 | A1 | 3/2016 | Iwai et al. |
| 2017/0306093 | A1 | 10/2017 | Matsumaru et al. |
| 2019/0378747 | A1 | 12/2019 | Akutsu et al. |
| 2021/0301133 | A1 | 9/2021 | Mizori |
| 2022/0204696 | A1 | 6/2022 | Mizori et al. |

FOREIGN PATENT DOCUMENTS

| | | | | |
|---|---|---|---|---|
| CN | 106029743 | B | | 3/2019 |
| CN | 107325285 | B | | 5/2021 |
| JP | 4-293937 | A | | 10/1992 |
| JP | 6-172737 | A | | 6/1994 |
| JP | H11284292 | A | * | 10/1999 |
| JP | 2005-503478 | A | | 2/2005 |
| JP | WO2015/053132 | A1 | | 4/2015 |
| JP | 2015-180750 | A | | 10/2015 |
| JP | 2017145344 | A | * | 8/2017 |
| TW | 201527875 | A | | 7/2015 |
| TW | 201546231 | A | | 12/2015 |
| TW | I606109 | B | | 11/2017 |
| TW | 201800539 | A | | 1/2018 |
| TW | I615419 | B | | 2/2018 |
| TW | I661935 | B | | 6/2019 |
| TW | I663058 | B | | 6/2019 |
| TW | 201936732 | A | | 9/2019 |
| TW | I742171 | B | | 10/2021 |
| TW | I749351 | B | | 12/2021 |
| TW | I797066 | B | | 4/2023 |

OTHER PUBLICATIONS

Taiwanese Office Action and Search Report for Taiwanese Application No. 112151578, dated Dec. 2, 2024.

* cited by examiner

ADHESIVE AND MULTILAYER STRUCTURE

CROSS REFERENCE TO RELATED APPLICATIONS

This application claims priority of Taiwan Patent Application No. 112151578, filed on Dec. 29, 2023, the entirety of which is incorporated by reference herein.

TECHNICAL FIELD

The disclosure relates to an adhesive and multilayer structure.

BACKGROUND

Advanced wafer processes are oriented toward miniaturization and finer line width processes. In order to avoid issues such as fragmentation and the formation of residues during wafer processing, there is a need to enhance the dimensional stability and temperature resistance of the adhesive materials used for temporarily protecting wafers.

Conventional temporary wafer protection materials include acrylic-based adhesives and polyamic-acid-based adhesives. Acrylic-based adhesives have poor thermal tolerance (≤150 °C), which is disadvantageous for semiconductor processes, and their softer properties make them prone to leaving residue on the sidewalls of electrodes. Polyamic-acid-based adhesives involve a two-step process where polyamic acid material is coated onto a substrate and then subjected to high temperatures (above 300 °C) to close the polyamic acid ring and form a polyimide film. However, such high process temperatures can lead to significant amounts of stress due to differences in the thermal expansion coefficients of the polyimide and the substrate, causing substrate bending, deformation, cracking, and even delamination, resulting in device damage.

Therefore, there is a need for a novel adhesive material that is suitable for advanced wafer processes.

SUMMARY

According to embodiments of the disclosure, the disclosure provides an adhesive. The adhesive includes a polyimide. The polyimide is a reaction product of a reactant (a) and a reactant (b), wherein the reactant (a) is a first diamine or the reactant (a) consists of the first diamine and a second diamine, wherein the reactant (b) consists of a first dianhydride and a second dianhydride, wherein the first diamine is a diphenyl-ether-moiety-containing diamine, the first dianhydride is a diphenyl-ether-moiety-containing dianhydride, the second diamine is not a diphenyl-ether-moiety-containing diamine, and the second dianhydride is not a diphenyl-ether-moiety-containing dianhydride. The total weight percentage of the first diamine and the first dianhydride is 55 wt % to 94 wt %, based on the total weight of the reactant (a) and the reactant (b).

According to embodiments of the disclosure, the disclosure also provides a multilayer structure, including a first substrate, and an adhesive layer disposed on the first substrate, wherein the adhesive layer is a cured product of the adhesive of the disclosure.

BRIEF DESCRIPTION OF THE DRAWINGS

The present disclosure can be more fully understood by reading the subsequent detailed description and examples with references made to the accompanying drawings, wherein.

DETAILED DESCRIPTION

Figure 1:
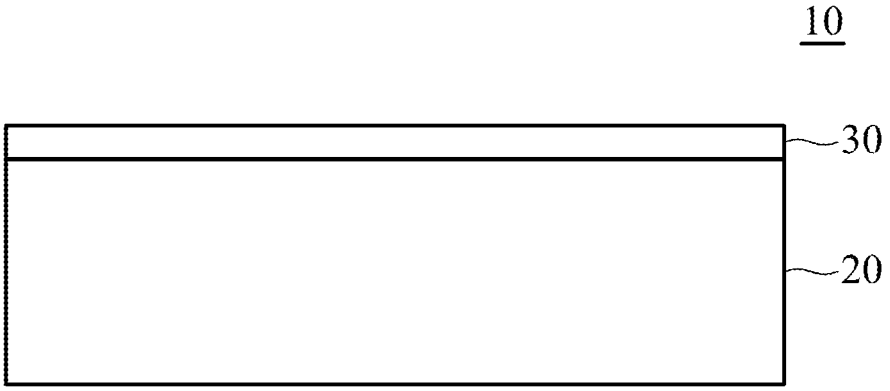
FIG. 1 is a schematic view of the multilayer structure according to an embodiment of the disclosure.

The adhesive and multilayer structure of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. As used herein, the term "about" in quantitative terms refers to plus or minus an amount that is general and reasonable to persons skilled in the art.

Moreover, the use of ordinal terms such as "first", "second", "third", etc., in the disclosure to modify an element does not by itself connote any priority, precedence, or der of one claim element over another or the temporal order in which it is formed, but are used merely as labels to distinguish one claim element having a certain name from another element having the same name (but for use of the ordinal term) to distinguish the claim elements.

It should be noted that the elements or devices in the drawings of the disclosure may be present in any form or configuration known to those skilled in the art. In addition, the expression "a layer overlying another layer", "a layer is disposed above another layer", "a layer is disposed on another layer", and "a layer is disposed over another layer" may refer to a layer that directly contacts the other layer, and they may also refer to a layer that does not directly contact the other layer, there being one or more intermediate layers disposed between the layer and the other layer.

The drawings described are only schematic and are non-limiting. In the drawings, the size, shape, or thickness of some of the elements may be exaggerated and not drawn on scale for illustrative purposes. The dimensions and the relative dimensions do not correspond to actual location to practice of the disclosure. The disclosure will be described with respect to particular embodiments and with reference to certain drawings but the disclosure is not limited thereto.

The disclosure provides an adhesive and multilayer structure, such as an adhesive that may be removed by laser light without leaving residue. The multilayer structure includes an adhesive layer prepared from the adhesive of the disclosure. According to embodiments of the disclosure, the adhesive of the disclosure includes a polyimide. The polyimide may be obtained by reacting a specific diamine (such as a diphenyl-ether-moiety-containing diamine) as reactant (a) with a specific dianhydride (such as diphenyl-ether-moiety-containing dianhydride and diphenyl-ether-moiety-free dianhydride) as reactant (b). By controlling the total weight of diphenyl-ether-moiety-containing diamine and diphenyl-ether-moiety-containing dianhydride relative to the total weight of reactant (a) and reactant (b) to meet a specific relationship, the polyimide of the disclosure may have a glass transition temperature (Tg) fallen in the range of 180 °C and 245 °C and a UV light transmittance in wavelengths between 260 nm and 355 nm being less than or equal to 5%. As a result, the adhesive including the polyimide of the disclosure can bond a first substrate (such as a transparent carrier) and a second substrate (such as an electronic element) at lower process temperatures (such as less than or equal to 300 °C), avoiding substrate warping caused by high-temperature processes. In addition, since the adhesive of the disclosure can absorb UV light (i.e. has low UV light transmittance), laser light may be used to irradiate the adhesive to separate the first substrate and the second substrate. As a result, it enables electronic elements to be separated from the substrate during processing or reworking and no adhesive residue is left.

According to embodiments of the disclosure, the disclosure provides an adhesive, wherein the adhesive includes a polyimide. According to embodiments of the disclosure, the polyimide may be a reaction product of a reactant (a) and a reactant (b), wherein the reactant (a) may be a first diamine or the reactant (a) may consist of a first diamine and a second diamine. The reactant (b) consists of a first dianhydride and a second dianhydride. According to embodiments of the disclosure, the first diamine may be a diphenyl-ether-moiety-containing diamine and the first dianhydride may be a diphenyl-ether-moiety-containing dianhydride. The diphenyl ether moiety may have a structure of

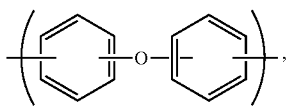

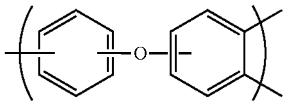

or

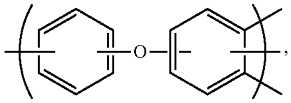

wherein at least one of the hydrogen bonded with the carbon of the moiety may be optionally replaced with fluorine, C1-C4 alkyl group, C1-C4 fluoroalkyl group, C1-C4 fluoroalkoxy group or C1-C4 alkoxy group. The second diamine is not a diphenyl-ether-moiety-containing diamine (i.e. the first diamine is different from the second diamine), and the second dianhydride is not a diphenyl-ether-moiety-containing dianhydride (i.e. the first dianhydride is different from the second dianhydride). It should be noted that, the polyimide of the disclosure may have a glass transition temperature (Tg) fallen in the range of 180 °C to 245 °C. (such as 190 °C, 200 °C, 210 °C, 220 °C, 230 °C or 240 °C) and a UV light transmittance in wavelengths between 260 nm and 355 nm being less than or equal to 5% (such as 4%, 3%, 2% or 1%). According to embodiments of the disclosure, the total weight percentage of the first diamine and the first dianhydride is ranged between 55 wt % to 94 wt % (such as 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt % or 93 wt %), based on the total weight of the reactant (a) and the reactant (b). When the weight of the first diamine and first dianhydride is controlled within the above range, the polyimide of the disclosure can have a glass transition temperature (Tg) fallen in the range between 180 °C and 245 °C and a UV light transmittance in wavelengths between 260 nm and 355 nm being less than or equal to 5%.

According to embodiments of the disclosure, when the reactant (a) is the first diamine and the reactant (b) consists of the first dianhydride and second dianhydride, the amount of the second dianhydride may be ranged between 6 wt % to 45 wt %, based on the total weight of the reactant (a) and the reactant (b) (i.e. all dianhydrides and diamines used to prepare the polyimide). According to embodiments of the disclosure, when the reactant (a) consists of the first diamine and second diamine, and the reactant (b) consists of the first dianhydride and second dianhydride, the total weight percentage of the second diamine and second dianhydride may also be ranged between 6 wt % to 45 wt %, based on the total weight of the reactant (a) and the reactant (b).

According to embodiments of the disclosure, the first dianhydride may be at least one of dianhydride having a structure represented by Formula (I)

Formula (I)

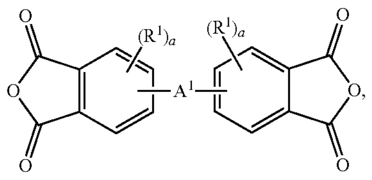

wherein $R^1$ is independently fluorine, C1-C4 alkyl group, C1-C4 fluoroalkyl group, C1-C4 fluoroalkoxy group or C1-C4 alkoxy group; a is independently 0, 1, 2 or 3; $A^1$ is —O—,

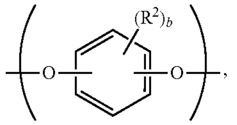

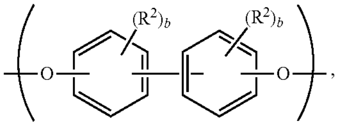

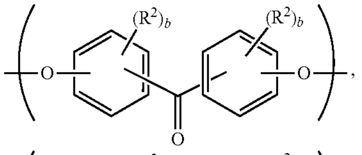

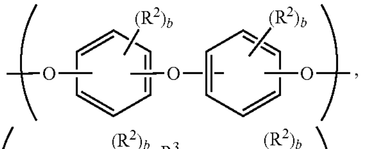

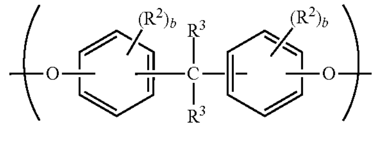

or

-continued

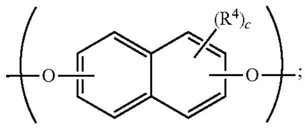

$R^2$ is independently fluorine, C1-C4 alkyl group, C1-C4 fluoroalkyl group, C1-C4 fluoroalkoxy group or C1-C4 alkoxy group; b is independently 0, 1, 2, 3 or 4; $R^3$ is independently hydrogen, fluorine, C1-C4 alkyl group, C1-C4 fluoroalkyl group, C1-C4 fluoroalkoxy group or C1-C4 alkoxy group; $R^4$ is independently fluorine, C1-C4 alkyl group, C1-C4 fluoroalkyl group, C1-C4 fluoroalkoxy group or C1-C4 alkoxy group; and, c is independently 0, 1, 2, 3, 4, 5 or 6.

According to embodiments of the disclosure, the first dianhydride may be

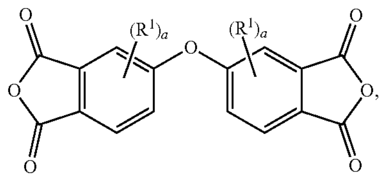

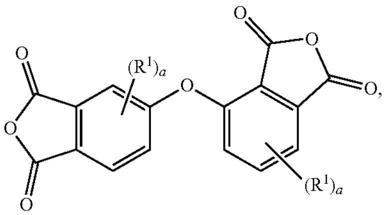

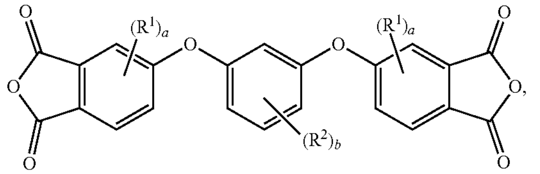

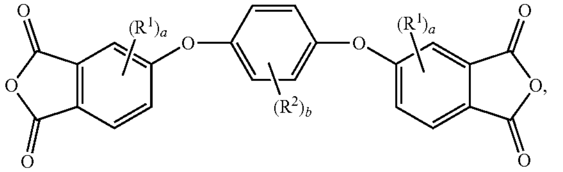

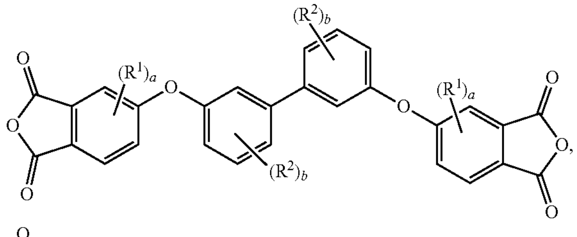

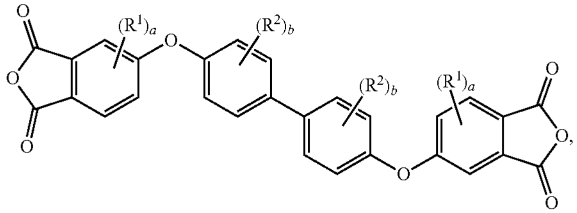

-continued

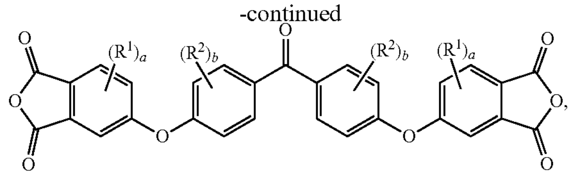

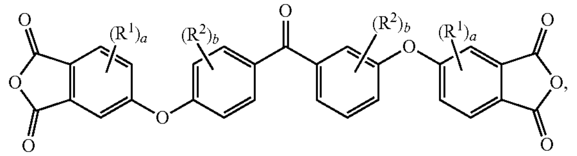

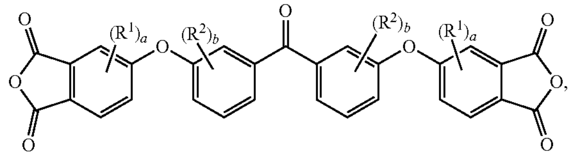

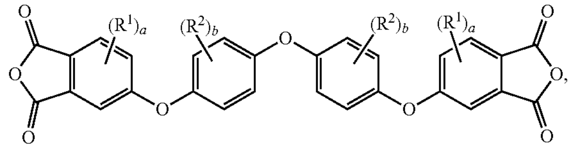

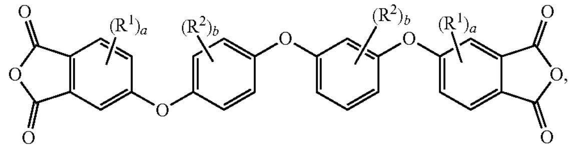

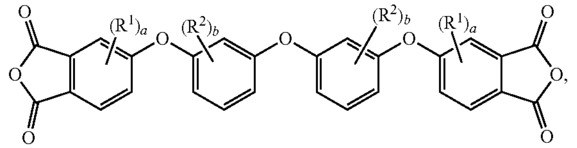

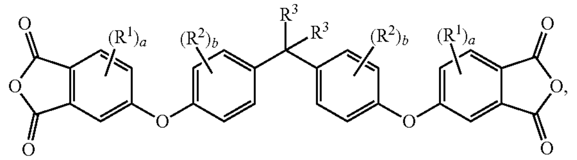

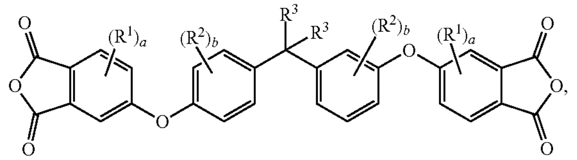

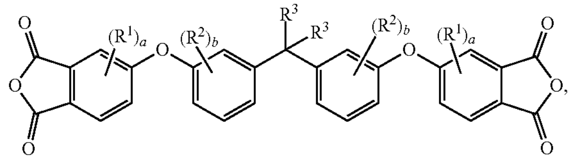

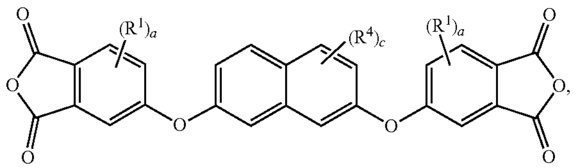

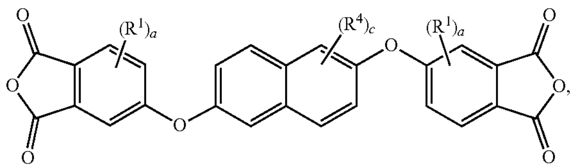

-continued

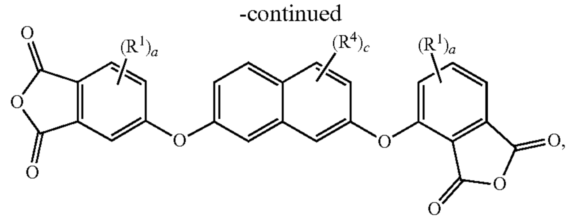

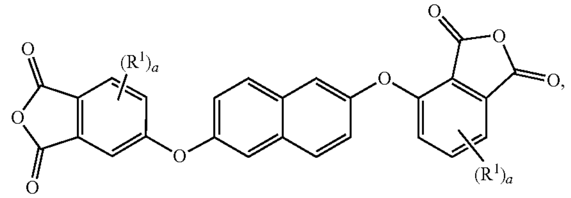

or a combination thereof, wherein $R^1$ is independently fluorine, C1-C4 alkyl group, C1-C4 fluoroalkyl group, C1-C4 fluoroalkoxy group or C1-C4 alkoxy group; a is independently 0, 1, 2 or 3; $R^2$ is independently fluorine, C1-C4 alkyl group, C1-C4 fluoroalkyl group, C1-C4 fluoroalkoxy group or C1-C4 alkoxy group; b is independently 0, 1, 2, 3 or 4; $R^3$ is independently hydrogen, fluorine, C1-C4 alkyl group, C1-C4 fluoroalkyl group, C1-C4 fluoroalkoxy group or C1-C4 alkoxy group; $R^4$ is independently fluorine, C1-C4 alkyl group, C1-C4 fluoroalkyl group, C1-C4 fluoroalkoxy group or C1-C4 alkoxy group; and, c is independently 0, 1, 2, 3, 4, 5 or 6.

According to embodiments of the disclosure, the first diamine may be at least one of diamine having a structure represented by Formula (II)

Formula (II)

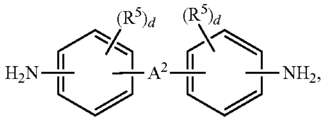

wherein $R^5$ is independently fluorine, C1-C4 alkyl group, C1-C4 fluoroalkyl group, C1-C4 fluoroalkoxy group or C1-C4 alkoxy group; d is independently 0, 1, 2, 3 or 4; $A^2$ is —O—,

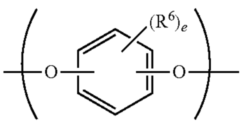

,

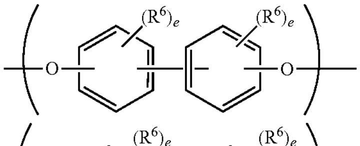

,

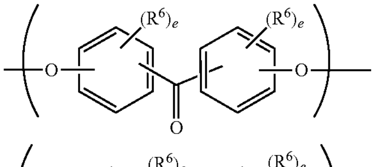

,

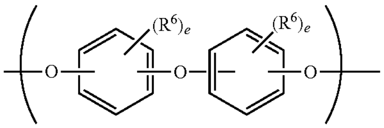

,

-continued

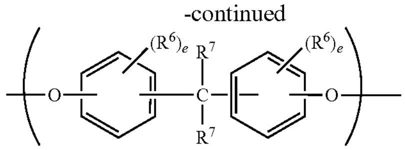

or

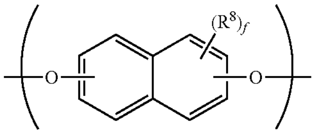

;

$R^6$ is independently fluorine, C1-C4 alkyl group, C1-C4 fluoroalkyl group, C1-C4 fluoroalkoxy group or C1-C4 alkoxy group; e is independently 0, 1, 2, 3 or 4; $R^7$ is independently hydrogen, fluorine, C1-C4 alkyl group, C1-C4 fluoroalkyl group, C1-C4 fluoroalkoxy group or C1-C4 alkoxy group; $R^8$ is independently fluorine, C1-C4 alkyl group, C1-C4 fluoroalkyl group, C1-C4 fluoroalkoxy group or C1-C4 alkoxy group; and, f is independently 0, 1, 2, 3, 4, 5 or 6.

According to embodiments of the disclosure, the first diamine may be

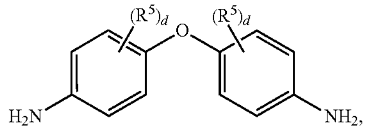

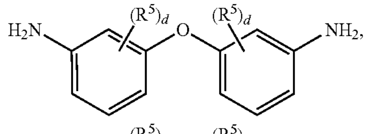

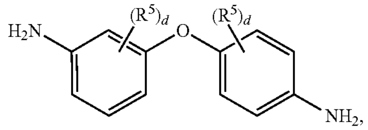

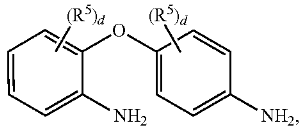

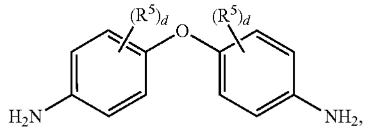

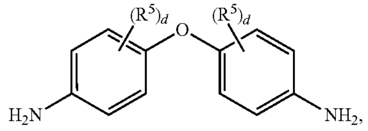

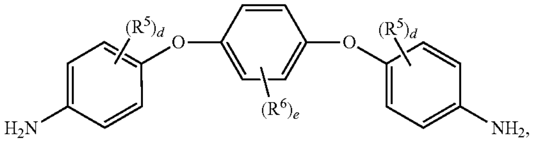

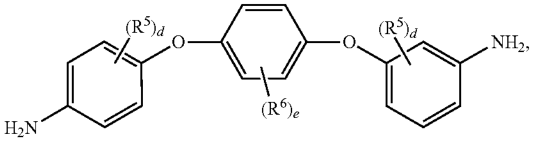

-continued
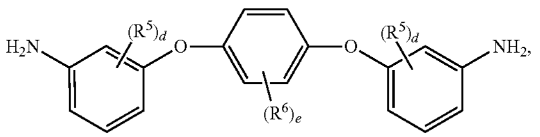
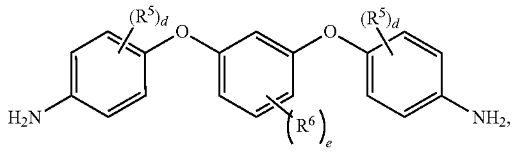
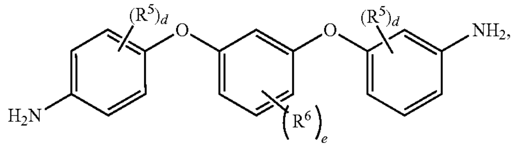
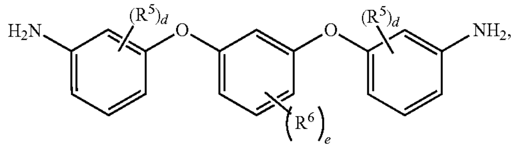
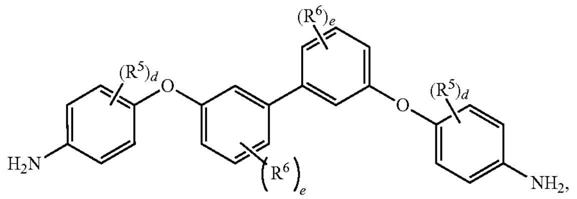
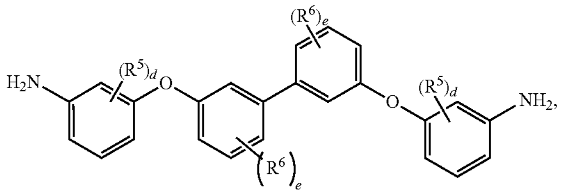
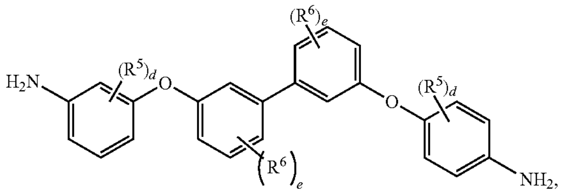
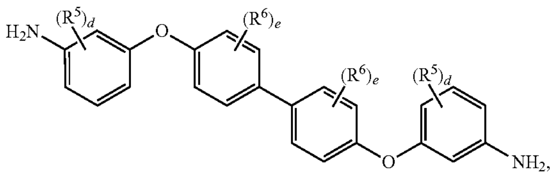
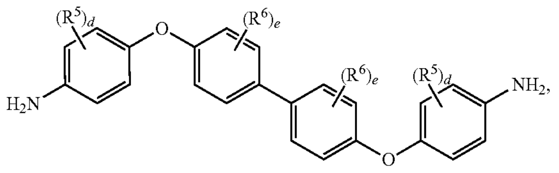
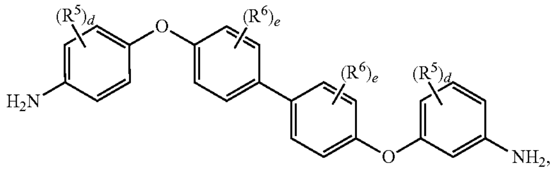
-continued
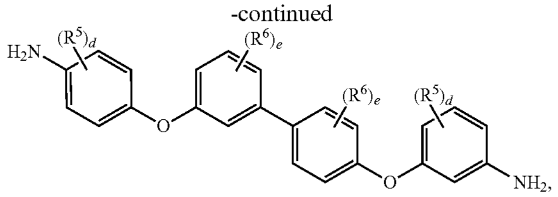
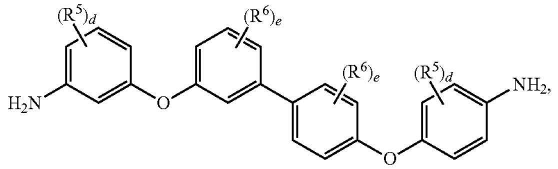
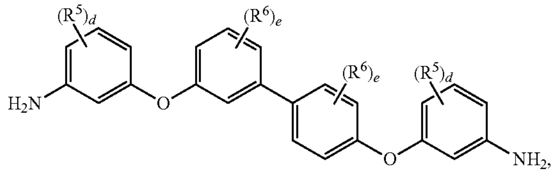
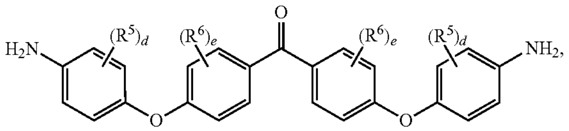
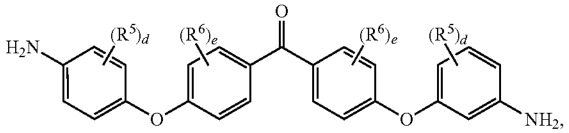
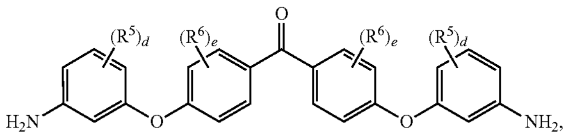
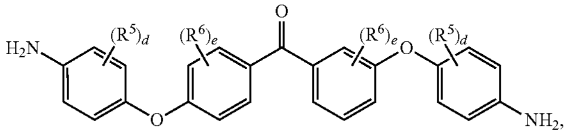
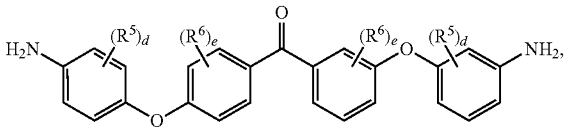
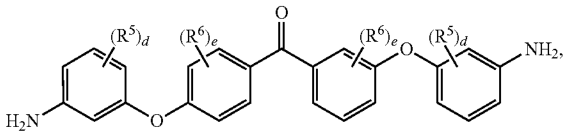
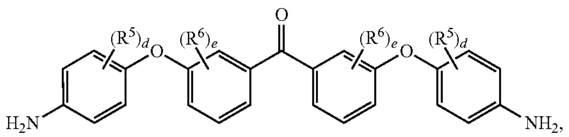
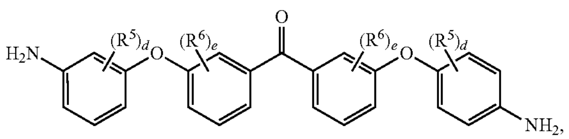
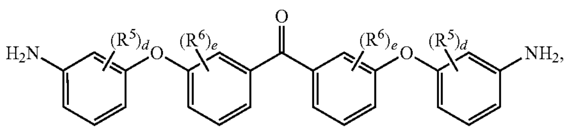

-continued

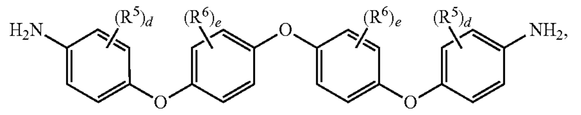

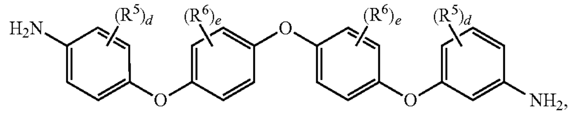

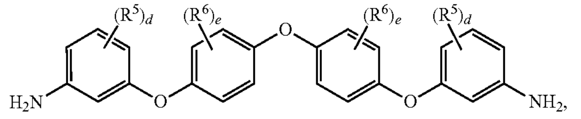

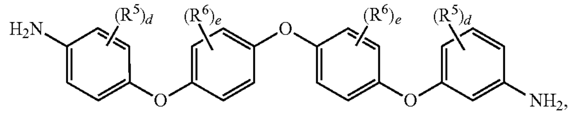

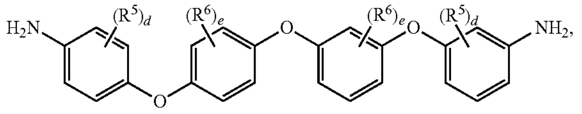

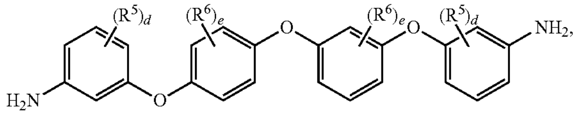

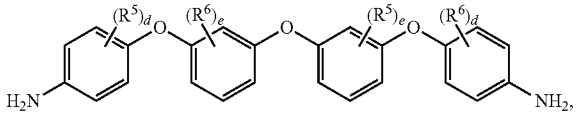

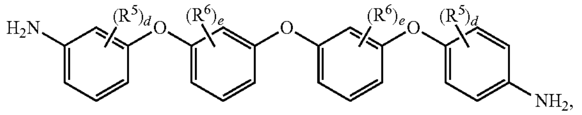

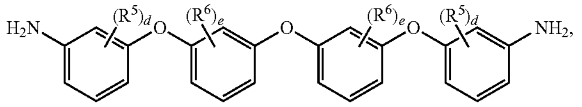

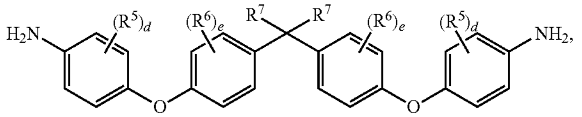

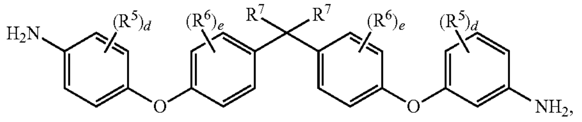

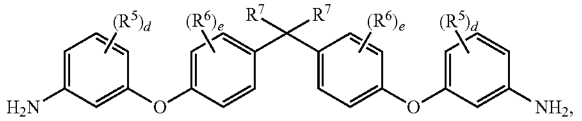

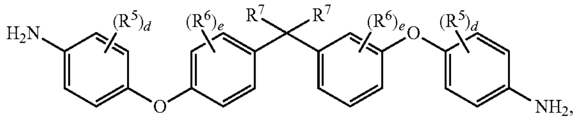

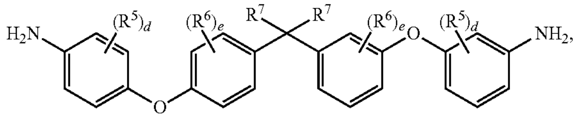

-continued

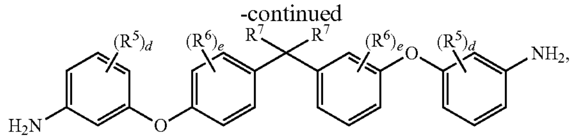

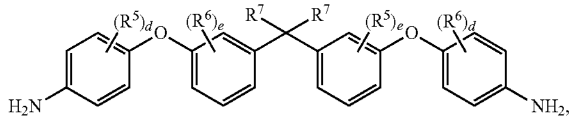

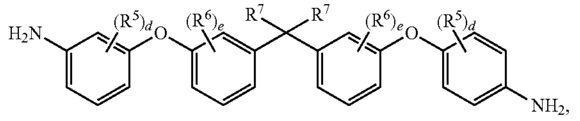

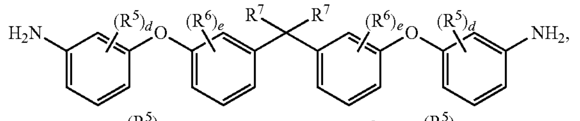

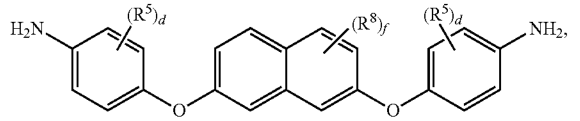

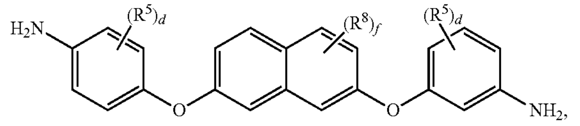

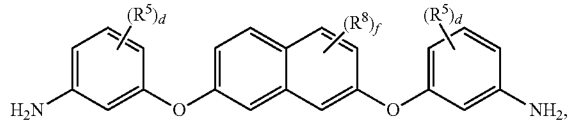

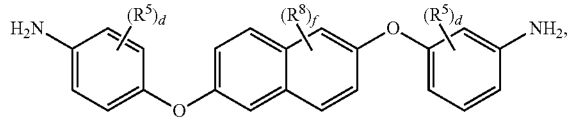

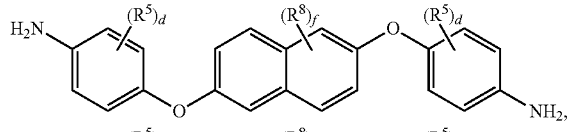

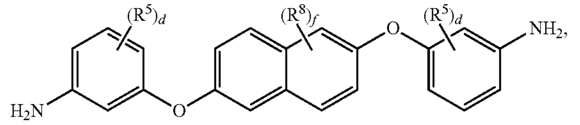

or a combination thereof, wherein $R^5$ is independently fluorine, C1-C4 alkyl group, C1-C4 fluoroalkyl group, C1-C4 fluoroalkoxy group or C1-C4 alkoxy group; d is independently 0, 1, 2, 3 or 4; $R^6$ is independently fluorine, C1-C4 alkyl group, C1-C4 fluoroalkyl group, C1-C4 fluoroalkoxy group or C1-C4 alkoxy group; e is independently 0, 1, 2, 3 or 4; $R^7$ is independently hydrogen, fluorine, C1-C4 alkyl group, C1-C4 fluoroalkyl group, C1-C4 fluoroalkoxy group or C1-C4 alkoxy group; $R^8$ is independently fluorine, C1-C4 alkyl group, C1-C4 fluoroalkyl group, C1-C4 fluoroalkoxy group or C1-C4 alkoxy group; and, f is independently 0, 1, 2, 3, 4, 5 or 6.

According to embodiments of the disclosure, the alkyl group of the disclosure may be linear or branched. According to embodiments of the disclosure, C1-C4 alkyl group may be methyl, ethyl, propyl, butyl or an isomer thereof. For example, C1-C4 alkyl group of the disclosure may be methyl, ethyl, n-propyl, isopropyl, n-butyl, sec-butyl, isobutyl, or tert-butyl.

According to embodiments of the disclosure, C1-C4 alkoxy group of the disclosure may be linear or branched. For example, C1-C4 alkoxy group may be methoxy, ethoxy, propoxy, butoxy, or an isomer thereof.

According to embodiments of the disclosure, C1-C4 fluoroalkyl group may be an alkyl group which a part of or all hydrogen atoms bonded on the carbon atom are replaced with fluorine atoms. C1-C4 fluoroalkyl group may be linear or branched, such as fluoromethyl, fluoroethyl, fluoropropyl, fluorobutyl, or an isomer thereof. Herein, fluoromethyl group may be monofluoromethyl group, difluoromethyl group or trifluoromethyl group, and fluoroethyl may be monofluoroethyl group, difluoroethyl group, trifluoroethyl group, tetrafluoroethyl, or perfluoroethyl According to embodiments of the disclosure, the C1-C4 fluoroalkoxy group of the disclosure may be linear or branched. For example, C1-C4 fluoroalkoxy group may be fluoromethoxy, fluoroethoxy, fluoropropoxy, fluorobutoxy, or an isomer thereof. Herein, fluoromethoxy group may be monofluoromethoxy group, difluoromethoxy group or trifluoromethoxy group, and fluoroethoxy may be monofluoroethoxy group, difluoroethoxy group, trifluoroethoxy group, tetrafluoroethoxy, or perfluoroethoxy.

According to embodiments of the disclosure, the second dianhydride is different from the first dianhydride, wherein the second dianhydride may be a diphenyl-ether-moiety-free dianhydride. According to embodiments of the disclosure, the second dianhydride does not consist of cyclobutane-1,2,3,4-tetracarboxylic dianhydride (CBDA) or the second dianhydride does not consist of 1,2,4,5-cyclohexanetetracarboxylic dianhydride (H-PMDA).

According to embodiments of the disclosure, the second dianhydride may be an aromatic dianhydride or an aliphatic dianhydride. According to embodiments of the disclosure, the second dianhydride may be bicyclo[2.2.2]oct-7-ene-2,3,5,6-tetracarboxylic dianhydride (B1317), bicyclooctane tetracarboxylic dianhydride (BODA), dicyclohexyl-3,4,3',4'-tetracarboxylic dianhydride (H-BPDA), [3-(carboxymethyl)-1,2,4-cyclopentanetricarboxylic acid 1,4:2,3-dianhydride](TCA-AH), 1,2,3,4-Butanetetracarboxylic dianhydride (BDA), 3,3',4,4'-biphenyl tetracarboylic dianhydride (4,4'-BPDA), 2,3,3',4'-biphenyltetracarboxylic dianhydride (3,4'-BPDA), 5-[4-(1,3-dioxo-2-benzofuran-5-yl)phenyl]-2-benzofuran-1,3-dione (1,4-PIB), 5-[3-(1,3-dioxo-2-benzofuran-5-yl)phenyl]-2-benzofuran-1,3-dione (1,3-PIB), 4,4'-(hexafluoroisopropylidene)diphthalic anhydride (6FDA), 3,3',4,4'-benzophenonetetracarboxylic dianhydride (BTDA), 9,9-bis(3,4-dicarboxyphenyl)fluorene dianhydride (BPAF), or a combination thereof.

According to embodiments of the disclosure, when the second dianhydride includes cyclobutane-1,2,3,4-tetracarboxylic dianhydride (CBDA) or 1,2,4,5-cyclohexanetetracarboxylic dianhydride (H-PMDA), the second dianhydride may further include bicyclo[2.2.2]oct-7-ene-2,3,5,6-tetracarboxylic dianhydride (B1317), bicyclooctane tetracarboxylic dianhydride (BODA), dicyclohexyl-3,4,3',4'-tetracarboxylic dianhydride (H-BPDA), [3-(carboxymethyl)-1,2,4-cyclopentanetricarboxylic acid 1,4:2,3-dianhydride](TCA-AH), 1,2,3,4-Butanetetracarboxylic dianhydride (BDA), 3,3',4,4'-biphenyl tetracarboylic dianhydride (4,4'-BPDA), 2,3,3',4'-biphenyltetracarboxylic dianhydride (3,4'-BPDA), 5-[4-(1,3-dioxo-2-benzofuran-5-yl)phenyl]-2-benzofuran-1,3-dione (1,4-PIB), 5-[3-(1,3-dioxo-2-benzofuran-5-yl)phenyl]-2-benzofuran-1,3-dione (1,3-PIB), 4,4'-(hexafluoroisopropylidene)diphthalic anhydride (6FDA), 3,3',4,4'-benzophenonetetracarboxylic dianhydride (BTDA), 9,9-bis(3,4-dicarboxyphenyl)fluorene dianhydride (BPAF), or a combination thereof.

According to embodiments of the disclosure, the second diamine is different from the first diamine, wherein the second diamine may be a diphenyl-ether-moiety-free diamine. According to embodiments of the disclosure, the second diamine does not consist of isophorone diamine (IPDA), or the second diamine does not consist of 4-methylcyclohexane-1,3-diamine (HTDA).

According to embodiments of the disclosure, the second diamine may be an aromatic diamine or an aliphatic diamine. According to embodiments of the disclosure, the second diamine may be 4,4'-methylenebis(cyclohexylamine) (PACM), 4,4'-methylenebis(2-methylcyclohexylamine) (MACM), bis(aminomethyl)norbornane (NORB), adamantane-1,3-diamine (ADDA), octahydro-4,7-methanoindene-1(2),5(6)-dimethanamine, 2,2'-bis(trifluoromethyl)benzidine (TFMB), 4,4'-diamino-2,2'-dimethylbiphenyl (m-TBHG), O-tolidine, 4,4'-methylenedianiline (4,4'-DAPM), 3,4'-methylenedianiline (3,4'-DAPM), 4,4'-diamino-3,3'-dimethyldiphenylmethane (MDA), 4,4'-methylenebis(2-ethylbenzenamine) (MOEA), 4,4'-methylenebis(2,6-diethylaniline) (MDEA), 9,10-bis(4-aminophenyl)anthracene (ADA), 2,6-naphthalenediamine, 2,6-anthracenediamine, 4,4"-diamino-p-terphenyl, 2,2-bis(4-aminophenyl) hexafluoropropane (AAF), α,α'-bis(4-aminophenyl)-1,4-diisopropylbenzene (Bisaniline P), 9,9-bis(4-aminophenyl)fluorene (FDA), 3,3',5,5'-tetramethylbenzidine (TMB), 4,4'-diamino-2,2'-dimethoxybiphenyl (m-DS), 4,4'-diaminobenzophenone (DABP), or a combination thereof.

According to embodiments of the disclosure, when the second diamine does not consist of isophorone diamine (IPDA) or the second diamine does not consist of 4-methylcyclohexane-1,3-diamine (HTDA), the second diamine may include 4,4'-methylenebis(cyclohexylamine) (PACM), 4,4'-methylenebis(2-methylcyclohexylamine) (MACM), bis(aminomethyl)norbornane (NORB), adamantane-1,3-diamine (ADDA), octahydro-4,7-methanoindene-1(2),5(6)-dimethanamine, 2,2'-bis(trifluoromethyl)benzidine (TFMB), 4,4'-diamino-2,2'-dimethylbiphenyl (m-TBHG), O-tolidine, 4,4'-methylenedianiline (4,4'-DAPM), 3,4'-methylenedianiline (3,4'-DAPM), 4,4'-diamino-3,3'-dimethyldiphenylmethane (MDA), 4,4'-methylenebis(2-ethylbenzenamine) (MOEA), 4,4'-methylenebis(2,6-diethylaniline) (MDEA), 9,10-bis(4-aminophenyl)anthracene (ADA), 2,6-naphthalenediamine (2,6-naphthalenediamine), 2,6-anthracenediamine (2,6-anthracenediamine), 4,4"-diamino-p-terphenyl (4,4"-diamino-p-terphenyl), 2,2-bis(4-aminophenyl) hexafluoropropane (AAF), α,α'-bis(4-aminophenyl)-1,4-diisopropylbenzene (Bisaniline P), 9,9-bis(4-aminophenyl) fluorene (FDA), 3,3',5,5'-tetramethylbenzidine (TMB), 4,4'-diamino-2,2'-dimethoxybiphenyl (m-DS), 4,4'-diaminobenzophenone (DABP), or a combination thereof.

According to embodiments of the disclosure, when the reactant (a) consists of the first diamine and a second diamine, the weight ratio of the first diamine to the second diamine may be 99.99:0.01 to 30:70, such as 99:1, 95:5, 90:10, 80:70, 60:40, 50:50 or 40:60. According to embodiments of the disclosure, when the reactant (b) consists of the first dianhydride and a second dianhydride, the weight ratio of the first dianhydride to the second dianhydride may be 99.99:0.01 to 25:75, such as 99:1, 95:5, 90:10, 80:70, 60:40, 50:50, 40:60 or 30:70.

According to embodiments of the disclosure, the weight average molecular weight (Mw) of the polyimide of the disclosure may be about 5,000 g/mol to 3,000,000 g/mol, such as about 8,000 g/mol to 2,500,000 g/mol, 10,000 g/mol to 2,300,000 g/mol, 15,000 g/mol to 2,000,000 g/mol, 10,000 g/mol to 1,000,000 g/mol, 10,000 g/mol to 500,000 g/mol or 10,000 g/mol to 300,000 g/mol. The weight average molecular weight (Mw) of the polyimide of the disclosure may be determined by gel permeation chromatography (GPC) based on a polystyrene calibration curve.

According to embodiments of the disclosure, the adhesive described may include the polyimide described and a solvent, thereby allowing the polyimide to be uniformly dispersed in the solvent. In addition, according to some embodiments of the disclosure, the adhesive of the disclosure may consist of the polyimide described and the solvent.

In embodiments of the disclosure, the solid content of the adhesive may be 2 wt % to 25 wt % (such as about 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, or 24 wt %). Herein, the solid content refers to the weight percentage of the components of the adhesive excluding the solvent, based on the total weight of the adhesive. According to embodiments of the disclosure, the thickness of the adhesive layer prepared from the adhesive is directly proportional to the solid content of the adhesive. Namely, the thickness of the adhesive layer prepared from the adhesive may be adjusted by varying the solid content of the adhesive.

According to embodiments of the disclosure, the solvent may be benzene, toluene, xylene, ethylbenzene, diethylbenzene, trimethylbenzene, triethylbenzene, cyclohexane, cyclohexene, decahydronaphthalene, dipentene, pentane, hexane, heptane, octane, nonane, decane, ethyl cyclohexane, methyl cyclohexane, p-menthane, dipropyl ether, dibutyl ether, anisole, butyl acetate, pentyl acetate, methyl isobutyl ketone (MEK), cyclohexylbenzene, cyclohexanone, cyclopentanone (CPN), triglyme, 1,3-dimethyl-2-imidazolidinone (DMI), N-methyl-2-pyrrolidone (NMP), methyl ethyl ketone (MEK), N,N-dimethylacetamide (DMAc), γ-butyrolactone (GBL), N,N-dimethylformamide (DMF), propylene glycol methyl ether acetate (PGMEA), dimethyl sulfoxide (DMSO), cresol, or a combination thereof.

According to embodiments of the disclosure, the polyimide described may be prepared by the following steps. First, the reactant (a) and reactant (b) are added to a reaction bottle with a solvent to obtain a mixture. The solid content of the mixture may be about 10 wt % to 50 wt % (such as about 11 wt %, 12 wt %, 14 wt %, 15 wt %, 18 wt %, 20 wt %, 21 wt %, 22 wt %, 25 wt %, 27 wt %, 29 wt %, 30 wt %, 32 wt %, 34 wt %, 35 wt %, 38 wt %, 40 wt %, 42 wt %, 44 wt %, 46 wt %, or 48 wt %). The reactant (a) and reactant (b) are as defined above. To ensure that the resulting polyimide can directly dissolve in the solvent without the need for replacement, the solvent used for preparing the polyimide may be selected from a group of N-methyl-2-pyrrolidone (NMP), N,N-dimethylacetamide (DMAc), γ-butyrolactone (GBL), N,N-dimethylformamide (DMF), cresol, cyclopentanone (CPN), and cyclohexanone. According to embodiments of the disclosure, the molar ratio of reactant (a) to reactant (b) may be about 1:1.05 to 1.05:1, such as about 1:1. Additionally, in order to accelerate the polymerization process to form the polyimide, a catalyst can optionally be added to the solution. The amount of the catalyst may be 0.1 wt % to 10 wt % (such as about 0.2 wt %, 0.5 wt %, 1 wt %, 2 wt %, 3 wt %, 5 wt %, 7 wt %, or 9 wt %), based on the total weight of the reactant (a) and reactant (b). Next, the mixture is reacted at 180 °C to 250 °C for 4 to 12 hours to obtain a solution including the polyimide of the disclosure (i.e. polyimide solution). According to embodiments of the disclosure, the catalyst may be any catalyst suitable for imidization reactions, such as tertiary amine. Examples of tertiary amine may be triethylenediamine (DABCO), N,N-dimethylcyclohexylamine, 1,2-dimethylimidazole, trimethylamine, triethylamine, tripropylamine, tributylamine, triethanolamine, N,N-dimethylethanolamine, N,N-diethylethanolamine, triethylenediamine, N-methylpyrrolidine, N-ethylpyrrolidine, N-methylpiperidine, N-ethylpiperidine, imidazole, pyridine, methylpyridine, dimethylpyridine, quinoline, or isoquinoline.

According to embodiments of the disclosure, the polyimide solution obtained from the reaction may be used directly as the adhesive of the disclosure, or the polyimide solution obtained may be further diluted with a solvent to be used as the adhesive of the disclosure. The adhesive of the disclosure substantially consists of the disclosed polyimide and a solvent. Specifically, the polyimide and the solvent are the main components of the adhesive, and the amount of the polyimide and the solvent may be about 90 wt % to 99.99 wt % of the adhesive (such as 93 wt %, 95 wt %, 98 wt %, 99 wt %, or 99.5 wt %). Additionally, the adhesive includes minor components other than the polyimide and the solvent. These minor components may include catalysts used in the preparation of the polyimide, unreacted portions of the reactant (a) and/or reactant (b), additives, or a combination thereof. The total weight of the minor components in the adhesive may be about 0.01 wt % to 10 wt %. According to embodiments of the disclosure, the additive may be any known additive in the field, such as fillers, flame retardants, viscosity modifiers, thixotropic agents, defoamers, leveling agents, surface treatment agents, stabilizers, antioxidants, or a combination thereof. According to other embodiments of the disclosure, the adhesive of the disclosure may consist of the aforementioned main components and minor ingredients. The viscosity of the adhesive of the disclosure at 25 °C may be about 100 cP to 10,000 cP, such as about 200 cP, 300 cP, 500 cP, 1,000 cP, 1,200 cP, 1,500 cP, or 1,800 cP. The viscosity of the adhesive of the disclosure is measured using a viscosity meter (Viscolead One, manufactured by Fungilab).

According to embodiments of the disclosure, a multilayer structure 10 is provided, as shown in FIG. 1. The multilayer structure 10 includes a first substrate 20 and an adhesive layer 30 disposed on the first substrate 20. The adhesive layer 30 includes a cured product obtained by subjecting the adhesive of the disclosure to a baking process. The thickness of the adhesive layer 30 is not specifically limited and may be selected based on practical requirements. The average thickness of the adhesive layer 30 may be about 1 μm to 500 μm, such as 2 μm, 3 μm, 4 μm, 5 μm, 8 μm, 10 μm, 20 μm, 30 μm, 40 μm, 50 μm, 100 μm, 150 μm, 200 μm, 300 μm, or 400 μm. The first substrate 20 is not limited and may be optionally modified by a person skilled in the field. The first substrate 20 may include metal sheet, silicon substrate, glass, or polymer films such as polyethylene terephthalate (PET) film, polybutylene terephthalate (PBT) film, polyethylene (PE) film, polyethylene naphthalate (PEN) film, polypropylene (PP) film, polyvinyl chloride (PVC) film, or polyacrylate film.

Figure 2:
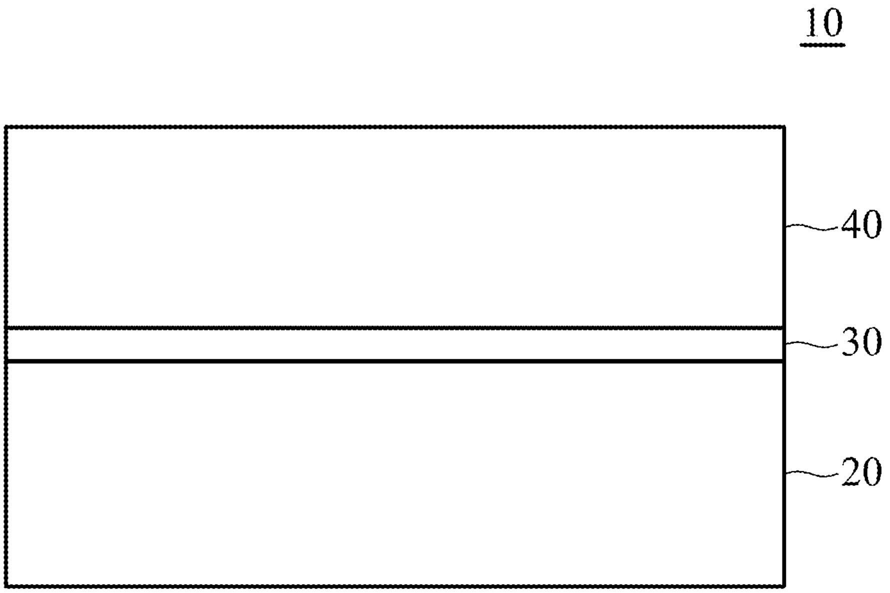
FIG. 2 is a schematic view of the multilayer structure according to another embodiment of the disclosure.

According to embodiments of the disclosure, the adhesive layer 30 is used to bond a second substrate 40 onto the first substrate 20, thereby forming the multilayer structure 10. According to embodiments of the disclosure, the first substrate 20 and the second substrate 40 may be two substrates that need to be bonded together. As shown in FIG. 2, the multilayer structure 10 further includes the second substrate

40, with the adhesive layer 30 disposed between the first substrate 20 and the second substrate 40. Moreover, when the adhesive layer 30 of the multilayer structure 10 is irradiated with a laser light (i.e. subjected to a laser separation process), the adhesion strength of the adhesive layer 30 may be reduced (for example, the adhesion strength between the first substrate 20 and the second substrate 40 may be reduced to below 40 gf). As a result, the second substrate 40 may be easily detached from the first substrate 20 without leaving adhesive residue on either the first substrate 20 or the second substrate 40, thereby improving the processing speed or reusability rate of electronic elements and enhancing the efficiency of processing or reworking processes. According to embodiments of the disclosure, the second substrate 40 may be an electronic element. In other words, the electronic element may be temporarily fixed to the first substrate 20 using the adhesive layer 30 of the disclosure. In addition, the electronic element is not limited and can include, for example, semiconductor chip, touch panel, display element, diode, solar cell, organic light-emitting diode (OLED), or other types of components.

According to embodiments of the disclosure, the multilayer structure 10 may be prepared by the following steps. First, a first substrate 20 is provided. Next, the adhesive of the disclosure is coated on the first substrate 20 to form a coating using a coating process. The coating process may be screen printing, spin coating, bar coating, blade coating, roller coating, dip coating, spray coating, or brush coating. Next, the coating undergoes a baking process to form the adhesive layer 30. The temperature of the baking process may be about 50 °C to 350 °C or not exceeding 300 °C. (such as 150 °C to 280 °C), and the process time of the baking process may be from 30 minutes to 8 hours. In embodiments, the baking process may be a single-stage or multi-stage process, for instance, baking at 100 °C to 200 °C for 15 minutes to 2 hours, followed by baking at 200 °C to 350 °C for 15 minutes to 6 hours. After the adhesive layer 30 is formed, a second substrate 40 may be disposed on top of the adhesive layer 30. Next, the result is subjected to a compression process to obtain the multilayer structure 10. The temperature of the compression process may be about 50 °C to 350 °C, and the compression time period may be 3 minutes to 8 hours.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Preparation of Polyimide

Table 1 lists the reagents involved in the Preparation Example of the disclosure.

TABLE 1

| | Name | Structure | use |
|---|---|---|---|
| TPE-R | 1,3-bis(4'-aminophenoxy) benzene | 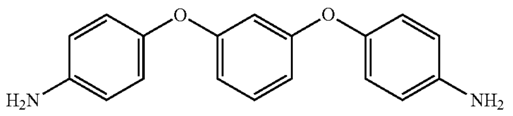 [SMILES: Nc1ccc(Oc2cccc(Oc3ccc(N)cc3)c2)cc1] | first diamine |
| BAPB | 4,4'-(1,1'-biphenyl-4,4'-diyldioxy)dianiline | 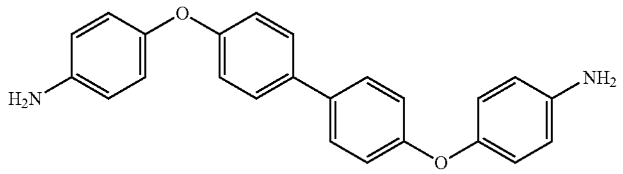 [SMILES: Nc1ccc(Oc2ccc(-c3ccc(Oc4ccc(N)cc4)cc3)cc2)cc1] | first diamine |
| BAPP | 2,2-bis [4-(4-aminophenoxy) phenyl] propane | 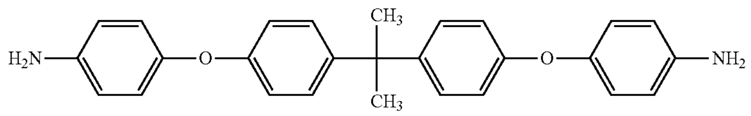 | first diamine |
| BAPK | 4,4'-bis(4-aminophenoxy) benzophenone | 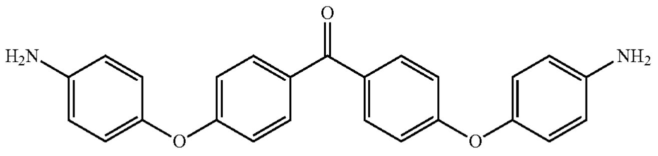 [SMILES: Nc1ccc(Oc2ccc(C(=O)c3ccc(Oc4ccc(N)cc4)cc3)cc2)cc1] | first diamine |
| NDA | 4,4'-[naphthalene-2,7-diylbis(oxy)]dianiline | 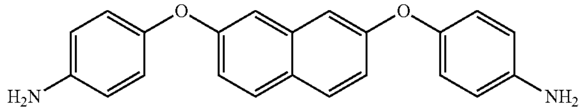 [SMILES: Nc1ccc(Oc2ccc3ccc(Oc4ccc(N)cc4)cc3c2)cc1] | first diamine |
| 4,4'-ODA | 4,4'-oxydianiline | 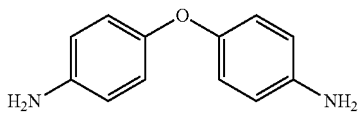 [SMILES: Nc1ccc(Oc2ccc(N)cc2)cc1] | first diamine |

TABLE 1-continued

| | | | |
|---|---|---|---|
| HFBAPP | 2,2-bis[4-(4-aminophenoxy) phenyl] hexafluoropropane | 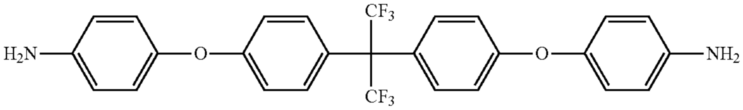 [SMILES: Nc1ccc(Oc2ccc(C(c3ccc(Oc4ccc(N)cc4)cc3)(C(F)(F)F)C(F)(F)F)cc2)cc1] | first diamine |
| BTFDPE | 4,4'-Oxybis[3-(trifluoroMethyl) aniline] | 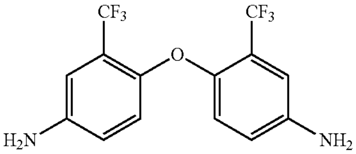 [SMILES: Nc1ccc(Oc2ccc(N)cc2C(F)(F)F)c(C(F)(F)F)c1] | first diamine |
| 3,3'-ODA | 3,3'-oxydianiline | 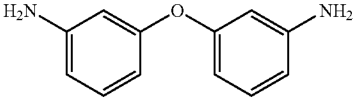 [SMILES: Nc1cccc(Oc2cccc(N)c2)c1] | first diamine |
| TPE-Q | 1,4-bis(4'-aminophenoxy) benzene | 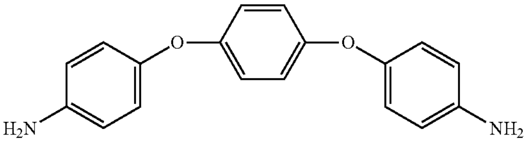 [SMILES: Nc1ccc(Oc2ccc(Oc3ccc(N)cc3)cc2)cc1] | first diamine |
| 3,4'-ODA | 3,4'-oxydianiline | 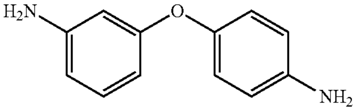 [SMILES: Nc1ccc(Oc2cccc(N)c2)cc1] | first diamine |
| TMB | 3,3',5,5'-tetramethylbenzidine | 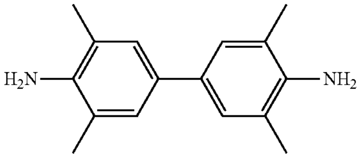 [SMILES: Cc1cc(-c2cc(C)c(N)c(C)c2)cc(C)c1N] | second diamine |
| TFMB | 2,2'-bis(trifluoromethyl) benzidine | 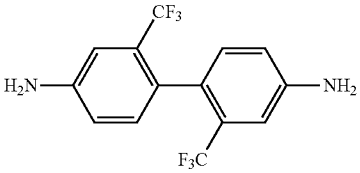 [SMILES: Nc1ccc(-c2ccc(N)cc2C(F)(F)F)c(C(F)(F)F)c1] | second diamine |
| PACM | 4,4'-methylenebis (cyclohexylamine) | 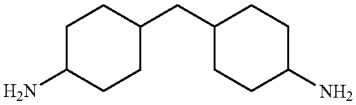 [SMILES: NC1CCC(CC2CCC(N)CC2)CC1] | second diamine |
| IPDA | isophorone diamine | 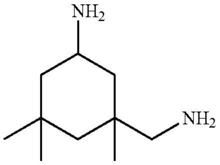 | second diamine |
| HTDA | 1-methyl-2,4-cyclohexane diamine | 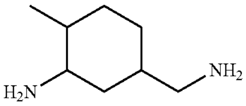 | second diamine |
| MACM | 4,4'-methylenebis(2-methylcyclohexyl-amine) | 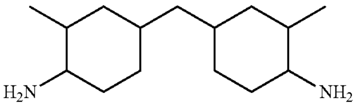 [SMILES: CC1CC(CC2CCC(N)C(C)C2)CCC1N] | second diamine |

TABLE 1-continued

| | | | |
|---|---|---|---|
| m-TBHG | 4,4'-diamino-2,2'-dimethylbiphenyl | 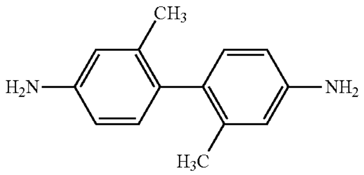 [SMILES: Cc1cc(N)ccc1-c1ccc(N)cc1C] | second diamine |
| m-DS | 4,4'-diamino-2,2'-dimethoxybiphenyl | 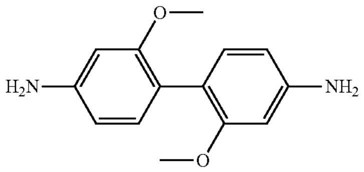 [SMILES: COc1cc(N)ccc1-c1ccc(N)cc1OC] | second diamine |
| NORB | bis(aminomethyl) norbornane | 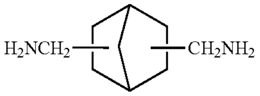 | second diamine |
| ADDA | adamantane-1,3-diamine | 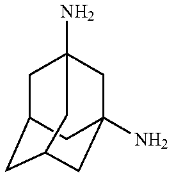 [SMILES: NC12CC3CC(C1)CC(N)(C3)C2] | second diamine |
| FDA | 9,9-bis(4-aminophenyl) fluorene | 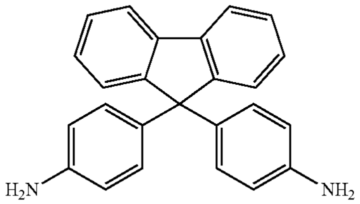 [SMILES: Nc1ccc(C2(c3ccc(N)cc3)c3ccccc3-c3ccccc32)cc1] | second diamine |
| o-tolidine | O-tolidine | 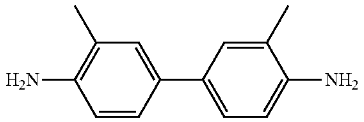 [SMILES: Cc1cc(-c2ccc(N)c(C)c2)ccc1N] | second diamine |
| DABP | 4,4'-diaminobenzo-phenone | 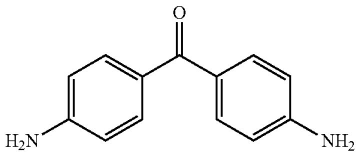 [SMILES: Nc1ccc(C(=O)c2ccc(N)cc2)cc1] | second diamine |
| — | 2,6-naphthalene-diamine | 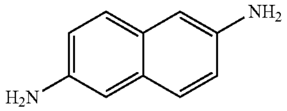 | second diamine |
| 3,4'-ODPA | 3,4'-Oxydiphthalic anhydride | 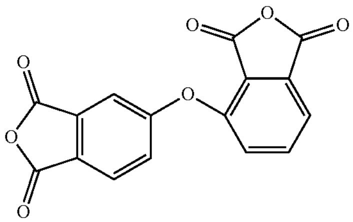 [SMILES: O=C1OC(=O)c2cc(Oc3cccc4c3C(=O)OC4=O)ccc21] | first dianhydride |

TABLE 1-continued

| | | | |
|---|---|---|---|
| 4,4'-ODPA | 4,4'-Oxydiphthalic anhydride | 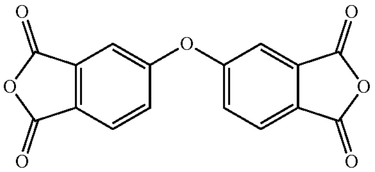 [SMILES: O=C1OC(=O)c2cc(Oc3ccc4c(c3)C(=O)OC4=O)ccc21] | first dianhydride |
| BPADA | 2,2-bis[4-(3,4-dicarboxyphenoxy) phenyl] propanedianhydride | 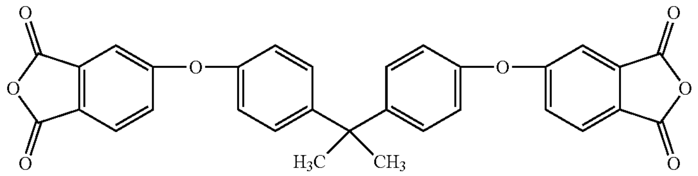 [SMILES: CC(C)(c1ccc(Oc2ccc3c(c2)C(=O)OC3=O)cc1)c1ccc(Oc2ccc3c(c2)C(=O)OC3=O)cc1] | first dianhydride |
| B1317 | bicyclo[2.2.2]oct-7-ene-2,3,5,6-tetracarboxylic dianhydride | 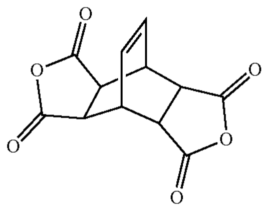 [SMILES: O=C1OC(=O)C2C3C=CC(C12)C1C(=O)OC(=O)C31] | second dianhydride |
| CBDA | cyclobutane-1,2,3,4-tetracarboxylic dianhydride | 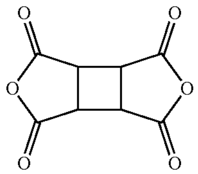 [SMILES: O=C1OC(=O)C2C1C1C(=O)OC(=O)C21] | second dianhydride |
| H-PMDA | 1,2,4,5-cyclohexanetetra-carboxylic dianhydride | 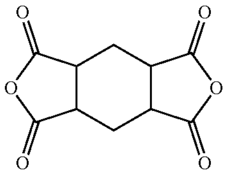 [SMILES: O=C1OC(=O)C2CC3C(=O)OC(=O)C3CC12] | second dianhydride |
| 4,4'-BPDA | 3,3',4,4'-biphenyl tetracarboylic dianhydride | 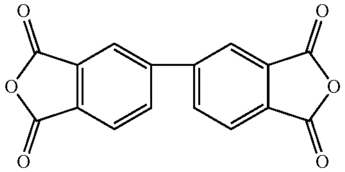 [SMILES: O=C1OC(=O)c2cc(-c3ccc4c(c3)C(=O)OC4=O)ccc21] | second dianhydride |
| 3,4'-BPDA | 2,3,3',4'-biphenyltetra-carboxylic dianhydride | 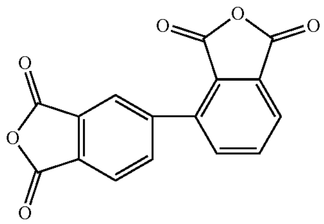 [SMILES: O=C1OC(=O)c2cc(-c3cccc4c3C(=O)OC4=O)ccc21] | second dianhydride |
| 6FDA | 4,4'-(hexafluoroiso-propylidene) diphthalic anhydride | 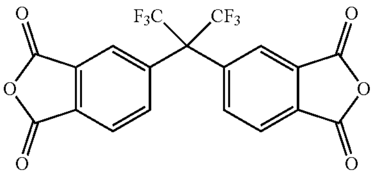 [SMILES: O=C1OC(=O)c2cc(C(c3ccc4c(c3)C(=O)OC4=O)(C(F)(F)F)C(F)(F)F)ccc21] | second dianhydride |

TABLE 1-continued

| | | | |
|---|---|---|---|
| H-BPDA | dicyclohexyl-3,4,3',4'-tetracarboxylic dianhydride | 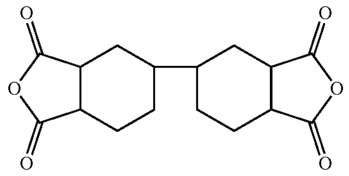 [SMILES: O=C1OC(=O)C2CC(C3CCC4C(=O)OC(=O)C4C3)CCC12] | second dianhydride |
| BODA | bicyclooctane tetracarboxylic dianhydride | 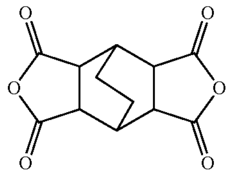 [SMILES: O=C1OC(=O)C2C3CCC(C12)C1C(=O)OC(=O)C31] | second dianhydride |
| TCA-AH | [3-(carboxymethyl)-1,2,4-cyclo-pentanetricarboxylic acid 1,4:2,3-dianhydride] | 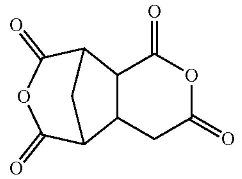 [SMILES: O=C1CC2C3CC(C(=O)OC3=O)C2C(=O)O1] | second dianhydride |
| BTDA | 3,3',4,4'-benzophenonetetra-carboxylic dianhydride | 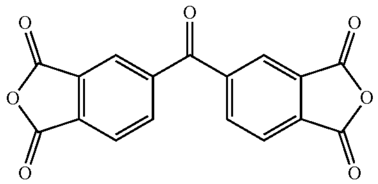 [SMILES: O=C(c1ccc2c(c1)C(=O)OC2=O)c1ccc2c(c1)C(=O)OC2=O] | second dianhydride |
| BPAF | 9,9-bis(3,4-dicarboxyphenyl) fluorene dianhydride | 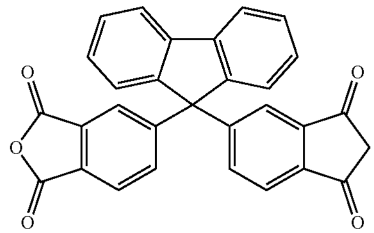 [SMILES: O=C1CC(=O)c2cc(C3(c4ccc5c(c4)C(=O)OC5=O)c4ccccc4-c4ccccc43)ccc21] | second dianhydride |
| 1,4-PIB | 5-[4-(1,3-dioxo-2-benzofuran-5-yl)phenyl]-2-benzofuran-1,3-dione | 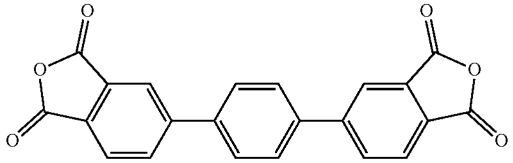 [SMILES: O=C1OC(=O)c2cc(-c3ccc(-c4ccc5c(c4)C(=O)OC5=O)cc3)ccc21] | second dianhydride |
| 1,3-PIB | 5-[3-(1,3-dioxo-2-benzofuran-5-yl)phenyl]-2-benzofuran-1,3-dione | 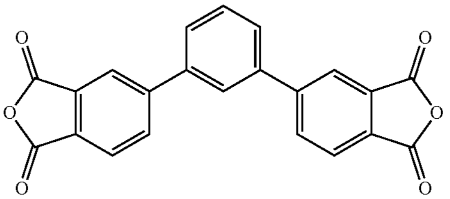 [SMILES: O=C1OC(=O)c2cc(-c3cccc(-c4ccc5c(c4)C(=O)OC5=O)c3)ccc21] | second dianhydride |

TABLE 1-continued

| | | | |
|---|---|---|---|
| BDA | 1,2,3,4-butanetetracarboxylic dianhydride | 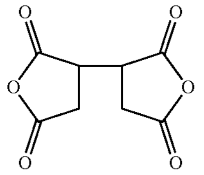 [SMILES: O=C1CC(C2CC(=O)OC2=O)C(=O)O1] | second dianhydride |

| | Name | use |
|---|---|---|
| | Isoquinoline | catalyst |
| GBL | gamma-butyrolactone | solvent |

Preparation Examples 1-9

Preparation Examples 1-9 were carried out by adding the reactant (a), reactant (b) and isoquinoline into a reaction bottle according to the components and quantities shown in Table 2. Gamma-butyrolactone (GBL) was used as the solvent to from mixtures with solid contents of about 30 wt %. Next, under a nitrogen atmosphere, the mixtures were reacted at 200 °C for 6 hours to produce solutions of Polyimide (1)-(9) with solid contents of about 29 wt %. The weight percentage of the total first diamine and first dianhydride, based on the total weight of reactant (a) and reactant (b), was calculated and shown in Table 2. After the obtained Polyimide (1)-(9) standing for 30 minutes, it was observed that those were all homogeneous mixtures.

TABLE 2

| | reactant (a) | | reactant (b) | | | the total weight percentage of the first diamine |
|---|---|---|---|---|---|---|
| | first diamine | second diamine | first dianhydride | second dianhydride | isoquinoline (g) | and first dianhydride |
| Preparation Example 1 | TPE-R (17.54 g)/ BAPB (88.42 g) | — | 3,4'-ODPA (74.45 g) | B1317 (14.89 g) | 8.05 | 92.40% |
| Preparation Example 2 | TPE-R (43.85 g)/ BAPB (33.16 g) | TFMB (12.01 g) | 3,4'-ODPA (65.14 g) | B1317 (22.34 g) | 7.28 | 80.50% |
| Preparation Example 3 | TPE-R (43.85 g)/ BAPB (11.05 g) | PACM (25.24 g) | 3,4'-ODPA (74.45 g) | B1317 (14.89 g) | 6.99 | 76.30% |
| Preparation Example 4 | TPE-R (43.85 g)/ BAPB (11.05 g) | PACM (25.24 g) | 3,4'-ODPA (37.23 g) | 4,4'-BPDA (17.65 g)/ B1317 (29.78 g) | 6.8 | 55.90% |
| Preparation Example 5 | BAPP (57.47 g)/ BAPK (3.96 g) | PACM (10.52 g) | BPADA (104.1 g) | — | 7.26 | 94.0% |
| Preparation Example 6 | NDA (8.56 g)/ 4,4'-ODA (40.05 g)/ HFBAPP (12.96 g) | | BPADA (104.1 g) | B1317 (12.41 g) | 7.34 | 93.0% |
| Preparation Example 7 | TPE-R (8.77 g)/ BAPB (11.05 g) | TFMB (48.06 g) | 3,4'-ODPA (37.23 g) | B1317 (44.67 g) | 6.18 | 38.10% |
| Preparation Example 8 | TPE-R (8.77 g)/ BAPB (44.21 g) | PACM (31.55 g) | 3,4'-ODPA (37.23 g) | B1317 (44.67 g) | 6.86 | 54.20% |
| Preparation Example 9 | HFBAPP (77.77 g) | PACM (10.52 g) | BPADA (104.1 g) | — | 7.93 | 94.5% |

Preparation Examples 10-15

Preparation Examples 10-15 were carried out by adding the reactant (a), reactant (b) and isoquinoline into a reaction bottle according to the components and quantities shown in Table 3. Gamma-butyrolactone (GBL) was used as the solvent to from mixtures with solid contents of about 30 wt %. Next, under a nitrogen atmosphere, the mixtures were reacted at 200 °C for 6 hours to produce products of Polyimide (10)-(15) with solid contents of about 29 wt %. The weight percentage of the total first diamine and first dianhydride, based on the total weight of reactant (a) and reactant (b), was calculated and shown in Table 3. After the obtained Polyimide (10)-(15) standing for 30 minutes, it was observed that those exhibited phase separation.

TABLE 3

| | reactant (a) | | reactant (b) | | | the total weight percentage of the first diamine |
|---|---|---|---|---|---|---|
| | first diamine | second diamine | first dianhydride | second dianhydride | isoquinoline (g) | and first dianhydride |
| Preparation Example 10 | TPE-R (11.69 g)/ BAPB (58.95 g) | — | BPADA (67.66 g) | CBDA (13.73 g) | 6.27 | 91.0% |
| Preparation Example 11 | TPE-R (11.69 g)/ BAPB (58.95 g) | — | BPADA (88.48 g) | CBDA (5.88 g) | 6.8 | 96.4% |
| Preparation Example 12 | TPE-R (11.69 g)/ BAPB (58.95 g) | — | BPADA (88.48 g) | H-PMDA (6.73 g) | 6.84 | 95.9% |
| Preparation Example 13 | TPE-R (11.69 g)/ BAPB (58.95 g) | — | BPADA (72.87 g) | H-PMDA (13.45 g) | 6.47 | 91.4% |
| Preparation Example 14 | TPE-R (11.69 g)/ BAPB (33.16 g) | IPDA (11.92 g) | BPADA (104.1 g) | — | 6.63 | 92.6% |
| Preparation Example 15 | TPE-R (11.69 g)/ BAPB (44.21 g) | IPDA (6.81 g) | BPADA (104.1 g) | — | 6.88 | 95.9% |

Preparation Examples 16-23

Preparation Examples 16-23 were carried out by adding the reactant (a), reactant (b) and isoquinoline into a reaction bottle according to the components and quantities shown in Table 4. Gamma-butyrolactone (GBL) was used as the solvent to from mixtures with solid contents of about 30 wt %. Next, under a nitrogen atmosphere, the mixtures were reacted at 200 °C for 6 hours to produce products of Polyimide (16)-(23) with solid contents of about 29 wt %. The weight percentage of the total first diamine and first dianhydride, based on the total weight of reactant (a) and reactant (b), was calculated and shown in Table 4. After the obtained Polyimide (16)-(23) standing for 30 minutes, it was observed that the obtained products of Polyimide (16)-(23) revealed the following: The product of Polyimide (16) exhibited phase separation; the products of Polyimide (17) and (19) formed a turbid mixture; and the products containing polyimide (18) and (20)-(23) formed a homogeneous mixture.

TABLE 4

| | reactant (a) | | reactant (b) | | | the total weight percentage of the |
|---|---|---|---|---|---|---|
| | first diamine | second diamine | first dianhydride | second dianhydride | isoquinoline (g) | first diamine and first dianhydride |
| Preparation Example 16 | TPE-R (11.69 g)/ | HTDA (5.13 g) | BPADA (104.1 g) | — | 6.81 | 96.9% |

TABLE 4-continued

| | reactant (a) | | reactant (b) | | | the total weight percentage of the |
|---|---|---|---|---|---|---|
| | first diamine | second diamine | first dianhydride | second dianhydride | isoquinoline (g) | first diamine and first dianhydride |
| | BAPB (44.21 g) | | | | | |
| Preparation Example 17 | TPE-R (14.62 g)/ 4,4'-ODA (40.05 g) | — | BPADA (104.1 g) | 4,4'-BPDA (14.71 g) | 7.15 | 91.5% |
| Preparation Example 18 | TPE-R (14.62 g)/ 4,4'-ODA (30.04 g) | MACM (11.92 g) | BPADA (104.1 g) | B1317 (12.41 g) | 7.14 | 85.9% |
| Preparation Example 19 | TPE-R (14.62 g)/ BAPB (73.69 g) | — | 4,4'-ODPA (38.78 g) | 6FDA (55.53 g) | 7.53 | 69.6% |
| Preparation Example 20 | TPE-R (17.54 g)/ BAPB (66.32 g) | MACM (14.30 g) | 4,4'-ODPA (46.53 g) | 6FDA (39.98 g)/ B1317 (14.89 g) | 8.23 | 65.3% |
| Preparation Example 21 | BTFDPE (30.26 g)/ BAPK (47.57 g) | MACM (21.46 g) | 4,4'-ODPA (55.84 g) | 3,4'-BPDA (17.65 g)/ H-BPDA (18.38 g) | 7.88 | 69.9% |
| Preparation Example 22 | BAPK (59.47 g) | m-TBHG (6.37 g)/ NORB (18.51 g) | 4,4'-ODPA (65.14 g) | 3,4'-BPDA (26.48 g) | 7.26 | 70.8% |
| Preparation Example 23 | BAPP (51.31 g) | m-DS (12.21 g)/ ADDA (12.47 g) | BPADA (91.09 g) | BODA (18.77 g) | 7.66 | 76.6% |

Preparation Examples 24-31

Preparation Examples 24-31 were carried out by adding the reactant (a), reactant (b) and isoquinoline into a reaction bottle according to the components and quantities shown in Table 5. Gamma-butyrolactone (GBL) was used as the solvent to from mixtures with solid content of about 30 wt %. Next, under a nitrogen atmosphere, the mixtures were reacted at 200 °C for 6 hours to produce solutions of Polyimide (24)-(31) with solid contents of about 29 wt %. The weight percentage of the total first diamine and first dianhydride, based on the total weight of reactant (a) and reactant (b), was calculated and shown in Table 5. After the obtained Polyimide (24)-(31) standing for 30 minutes, it was observed that those were all homogeneous mixtures.

TABLE 5

| | reactant (a) | | reactant (b) | | | the total weight percentage of the first diamine |
|---|---|---|---|---|---|---|
| | first diamine | second diamine | first dianhydride | second dianhydride | isoquinoline (g) | and first dianhydride |
| Preparation Example 24 | 3,3'-ODA (30.04 g) | TMB (14.42 g) MACM (21.46 g) | BPADA (93.69 g) | BTDA (19.33 g)/ TCA-AH (13.45 g) | 7.93 | 64.3% |
| Preparation Example 25 | BTFDPE (50.43 g) | 2,6-naphthalenediamine (4.75 g)/ NORB (18.51 g) | 4,4'-ODPA (83.76 g) | BPAF (13.75 g) | 7.06 | 78.4% |
| Preparation Example 26 | BAPP (92.36 g) | FDA (8.71 g) | 4,4'-ODPA (31.02 g) | 6FDA (22.21 g)/ BDA (19.81 g) | 7.18 | 70.9% |
| Preparation Example 27 | HFBAPP (77.77 g) | o-tolidine (10.61 g)/ NORB (7.71 g) | 3,4'-ODPA (54.29 g) | 1,4-PIB 9.26 g)/ B1317 (12.41 g) | 7.09 | 76.8% |

TABLE 5-continued

| | reactant (a) | | reactant (b) | | | the total weight percentage of the first diamine |
|---|---|---|---|---|---|---|
| | first diamine | second diamine | first dianhydride | second dianhydride | isoquinoline (g) | and first dianhydride |
| Preparation Example 28 | TPE-Q (36.54 g) | DABP (5.31 g)/ MACM (23.84 g) | BPADA (78.07 g) | 1,3-PIB (18.52 g)/ B1317 (12.41 g) | 7.2 | 65.6% |
| Preparation Example 29 | NDA (34.24 g) | ADA (18.02 g)/ MACM (23.84 g) | BPADA (78.07 g) | BTDA (8.06 g) B1317 (18.61 g) | 7.46 | 62.1% |
| Preparation Example 30 | 3,4'-ODA (36.04 g) | 2,6-anthracenediamine (12.5 g)/ MACM (14.3 g) | BPADA (93.69 g) | 6FDA (26.65 g)/ B1317 (14.89 g) | 8.17 | 65.5% |
| Preparation Example 31 | 3,4'-ODA (25.03 g) | 4,4''-Diamino-p-terphenyl (6.51 g)/ NORB (15.43 g) | BPADA (104.1 g) | 6FDA (22.21 g) | 7.15 | 74.5% |

Preparation of Adhesive

Examples 1-22

The solutions (34.48 parts by weight) of Polyimide (1)-(9), (18), and (20)-(31) obtained from Preparation Examples 1-9, 18, and 20-31 were mixed with gamma-butyrolactone (165 parts by weight), respectively. After being stirred for 30 minutes, Adhesives (1)-(22) with a solid content of about 5 wt % were obtained.

The viscosities of Adhesive (1)-(22) were measured at 25 °C by a viscosity meter (Viscolead One, manufactured by Fungilab), and the results were shown in Table 6.

TABLE 6

| | Adhesive (1) | Adhesive (2) | Adhesive (3) | Adhesive (4) | Adhesive (5) |
|---|---|---|---|---|---|
| viscosity (cP) | 965 | 976 | 994 | 1,007 | 983 |
| | Adhesive (6) | Adhesive (7) | Adhesive (8) | Adhesive (9) | Adhesive (10) |
| viscosity (cP) | 892 | 926 | 941 | 935 | 938 |
| | Adhesive (11) | Adhesive (12) | Adhesive (13) | Adhesive (14) | Adhesive (15) |
| viscosity (cP) | 917 | 972 | 884 | 928 | 973 |
| | Adhesive (16) | Adhesive (17) | Adhesive (18) | Adhesive (18) | Adhesive (20) |
| viscosity (cP) | 892 | 963 | 938 | 895 | 947 |
| | Adhesive (21) | Adhesive (22) | | | |
| viscosity (cP) | 951 | 927 | | | |

Preparation of Test Sample 4-inch glass substrates (commercially available from William Optical Technology Corporation) were provided. Next, Adhesives (1)-(22) were spin-coated onto a piece of the 4-inch glass substrates at 1000 rpm for 60 seconds, respectively, to form thin films on the glass substrates. The thin films were subjected to a drying process (baked at 200 °C for 60 minutes, followed by 280 °C for 60 minutes). After the thin films were cooled down, Samples (1)-(22) (with the structures of adhesive layer/glass substrate) were obtained.

Next, the average thicknesses, glass transition temperatures (Tg), and transmittances at 355 nm of Adhesive layers (1)-(22) were measured, and the results were shown in Table 7. The average thicknesses were measured via a white light interferometer (commercially available from Agewell Technology Corp). Those were obtained by measuring the thicknesses of 6 points on the adhesive layers and then averaging those values. The glass transition temperatures were analyzed via a differential scanning calorimeter (Discovery DSC25) under a nitrogen atmosphere in the conditions of 10 °C/minute of heating rate from room temperature to the onset decomposition temperatures of the adhesive layers. The transmittances of the adhesive layers were measured via a UV/Vis/NIR Spectrophotometer (LAMBDA 1050) at a wavelength of 355 nm.

TABLE 7

| | Adhesive layer (1) | Adhesive layer (2) | Adhesive layer (3) | Adhesive layer (4) | Adhesive layer (5) |
|---|---|---|---|---|---|
| average thickness (μm) | 10.3 | 9.6 | 10.5 | 10.3 | 9.8 |
| glass transition temperature (°C.) | 200 | 212 | 220 | 235 | 187 |
| transmittance | ≤1% | ≤1% | 2.2% | 3.5% | ≤1% |

TABLE 7-continued

| | Adhesive layer (6) | Adhesive layer (7) | Adhesive layer (8) | Adhesive layer (9) | Adhesive layer (10) |
|---|---|---|---|---|---|
| average thickness (μm) | 9.7 | 10.4 | 10.2 | 10.4 | 10.3 |
| glass transition temperature (°C) | 196 | 248 | 238 | 177 | 206 |
| transmittance | ≤1% | 3.1% | 5.5% | ≤1% | ≤1% |
| | Adhesive layer (11) | Adhesive layer (12) | Adhesive layer (13) | Adhesive layer (14) | Adhesive layer (15) |
| average thickness (μm) | 10.6 | 10.2 | 9.7 | 9.8 | 10.4 |
| glass transition temperature (°C) | 232 | 226 | 227 | 219 | 233 |
| transmittance | ≤1% | ≤1% | ≤1% | ≤1% | ≤1% |
| | Adhesive layer (16) | Adhesive layer (17) | Adhesive layer (18) | Adhesive layer (19) | Adhesive layer (20) |
| average thickness (μm) | 10.5 | 9.8 | 9.6 | 10.2 | 10.4 |
| glass transition temperature (°C) | 215 | 227 | 219 | 231 | 237 |
| transmittance | ≤1% | ≤1% | ≤1% | ≤1% | 2.2% |

| | Adhesive layer (21) | Adhesive layer (22) |
|---|---|---|
| average thickness (μm) | 10.5 | 10.4 |
| glass transition temperature (°C) | 231 | 222 |
| transmittance | ≤1% | ≤1% |

As shown in Tables 2-5 and 7, when using the specific diamines and dianhydrides of the disclosure to prepare polyimides, and controlling the total weight percentages of the first diamines and first dianhydrides within the range of 55 wt % to 94 wt %, the resulting adhesive layers exhibit glass transition temperatures (Tg) falling within the range of 180 °C to 245 °C and a ultraviolet transmittance at 355 nm being less than or equal to 5%. Conversely, when the total weight percentages of the first diamines and first dianhydrides are below 55 wt % or above 94 wt %, the glass transition temperatures (Tg) of the obtained adhesive layers do not fall within the range of 180 °C to 245 °C or exhibit ultraviolet transmittance greater than 5% at 355 nm. In addition, when only cyclobutane-1,2,3,4-tetracarboxylic dianhydride (CBDA) or only 1,2,4,5-cyclohexanetetracarboxylic dianhydride (H-PMDA) is used as the second dianhydride, the resulting reaction product is not a homogeneous mixture. Similarly, when only isophorone diamine (IPDA) or only 4-methylcyclohexane-1,3-diamine (HTDA) is used as the second diamine, resulting reaction product is not a homogeneous mixture. The results indicate that the obtained polyimides are poorer solubility in GBL.

Preparation of Multilayer Structure 4-inch wafers were provided. Next, Samples (1)-(22) were bonded to a piece of the 4-inch wafers, respectively, wherein electrodes of the 4-inch wafers contacted with the adhesive layers of Samples (1)-(22). A loading of 5 kg was applied on the 4-inch wafer end of each resulting multilayer combination and then baked it at 300 °C for 60 minutes. After being cooled to RT, Multilayer structures (1)-(22) were obtained. Next, the 4-inch wafers bonded on the glass substrates in Multilayer structures (1)-(22) were subjected to an adhesion test. The adhesion test included following steps. Each one of the Multilayer structures (1)-(22) was inverted to make the 4-inch wafers downwards and maintained for 10 minutes. When the 4-inch wafers were detached from the glass substrates, the adhesion test for the multilayer structures was marked with X. Otherwise, it was marked with O. The results were shown on Table 8.

Next, a peeling test was performed to evaluate detachment of the 4-inch wafers from the glass substrates on Multilayer structures (1)-(22) after a laser separation process. The peeling test included following steps. A laser light with a wavelength of 355 nm (with a power of 2 kW and a scanning irradiation rate of 3 m/s) was irradiated on the adhesive layers of the multilayer structures via a laser machine (commercially available from Kin-Yo Optoelectronics). After being irradiated, the adhesion strengths between the glass substrates and 4-inch wafers were measured by a tensile testing machine (QC-506B1, Guang Rhenium Instrument Co.) with a 90-degree pulling force (at an upward pulling speed of 300 mm/min). The results were shown on Table 8.

Next, the 4-inch wafers of Multilayer structures (1)-(22) were inspected to evaluate adhesive residue after those were detached from the glass substrates. The evaluation method included following steps. After the 4-inch wafers of Multilayer structures (1)-(22) were removed from the glass substrates, the 4-inch wafers were rinsed and cleaned with isopropanol (IPA). Next, an optical microscope was used to inspect the 4-inch wafers to evaluate adhesive residue. The results were shown on Table 8.

TABLE 8

| | Multilayer structure (1) | Multilayer structure (2) | Multilayer structure (3) | Multilayer structure (4) | Multilayer structure (5) |
|---|---|---|---|---|---|
| adhesion test | ○ | ○ | ○ | ○ | ○ |
| adhesion strength after a laser separation process (gf/25 mm) | 12 | 15 | 21 | 28 | 11 |
| adhesive residue | No | No | No | No | No |
| | Multilayer structure (6) | Multilayer structure (7) | Multilayer structure (8) | Multilayer structure (9) | Multilayer structure (10) |
| adhesion test | ○ | X | ○ | ○ | ○ |
| adhesion strength after a laser separation process (gf/25 mm) | 12 | — | >50 | 10 | 15 |
| adhesive residue | No | — | inseparable | Yes | No |

TABLE 8-continued

| | Multi-layer structure (11) | Multi-layer structure (12) | Multi-layer structure (13) | Multi-layer structure (14) | Multi-layer structure (15) |
|---|---|---|---|---|---|
| adhesion test | ○ | ○ | ○ | ○ | ○ |
| adhesion strength after a laser separation process (gf/25 mm) | 15 | 18 | 13 | 16 | 17 |
| adhesive residue | No | No | No | No | No |

| | Multi-layer structure (16) | Multi-layer structure (17) | Multi-layer structure (18) | Multi-layer structure (19) | Multi-layer structure (20) |
|---|---|---|---|---|---|
| adhesion test | ○ | ○ | ○ | ○ | ○ |
| adhesion strength after a laser separation process (gf/25 mm) | 13 | 14 | 14 | 18 | 20 |
| adhesive residue | No | No | No | No | No |

| | Multi-layer structure (21) | Multi-layer structure (22) | — | — | — |
|---|---|---|---|---|---|
| adhesion test | ○ | ○ | — | — | — |
| adhesion strength after a laser separation process (gf/25 mm) | 15 | 12 | — | — | — |
| adhesive residue | No | No | — | — | — |

As shown in Table 8, when the glass transition temperatures Tg) of the obtained adhesive layers fall within the range of 180 °C to 245 °C, the 4-inch wafers and the glass substrates are bonded by the adhesive layers in a thermo-compression process using a relatively low temperature. In addition, when the adhesive layers exhibit low UV transmittance, it is apt to absorb the laser light, and thereby the detachment of the wafers from the glass substrates is facilitated. For Multilayer structure (7), since the total amount of the first diamine and the first dianhydride used to form the polyimide is less than 55 wt %, the adhesive layer is not apt to be softened to bond the wafer and the glass substrate during the thermo-compression process because of the higher glass transition temperature of the adhesive layer thereof. For multilayer structure (8), the wafer and the glass substrate are not separated (adhesion strength>50 gf) because absorption of laser light at a wavelength of 355 nm for the adhesive layer is relatively weak. For multilayer structure (9), the adhesive layer is apt to be trapped on the sidewalls of the electrodes to form adhesive residue because the adhesive layer had lower glass transition temperature (<180 °C.).

Accordingly, by controlling the total weight of diphenyl-ether-moiety-containing diamine and diphenyl-ether-moiety-containing dianhydride and the total weight of reactant (a) and reactant (b) to meet a specific relationship, the glass transition temperatures (Tg) of the polyimides on the disclosure fall in the range of 180 °C and 245 °C and the UV light transmittances of the polyimides in wavelengths between 260 nm and 355 nm were less than or equal to 5%. As a result, a first substrate and a second substrate may be bonded by the adhesive containing the polyimide on the disclosure at a lower process temperature to avoid substrate warping caused by high-temperature processes. In addition, since UV light was absorbed by the adhesive containing the polyimide, the first substrate and the second substrate may be separated by irradiation of the laser light. As a result, separation of electronic elements from substrates during processing or reworking is enabled and no adhesive residue is formed.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An adhesive, comprising a polyimide, wherein the polyimide is a reaction product of a reactant (a) and a reactant (b), wherein the reactant (a) is a first diamine, or the reactant (a) consists of the first diamine and a second diamine, and the reactant (b) consists of a first dianhydride and a second dianhydride, wherein the first dianhydride is a diphenyl-ether-moiety-containing dianhydride, the second diamine is not a diphenyl-ether-moiety-containing diamine, and the second dianhydride is not a diphenyl-ether-moiety-containing dianhydride, wherein the total weight percentage of the first diamine and the first dianhydride is 55 wt % to 94 wt %, based on the total weight of the reactant (a) and the reactant (b), wherein the first diamine is at least one of diamine having a structure represented by Formula (II)

Formula (II)

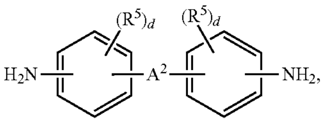

wherein $R^5$ is independently fluorine, C1-C4 alkyl group, C1-C4 fluoroalkyl group, C1-C4 fluoroalkoxy group or C1-C4 alkoxy group; d is independently 0, 1, 2, 3 or 4; $A^2$ is

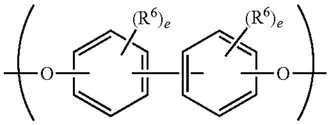

,

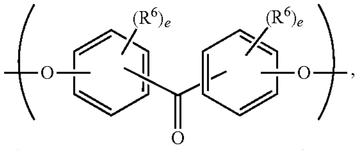

,

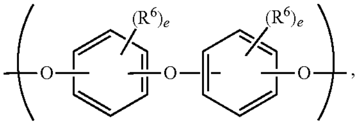

, or

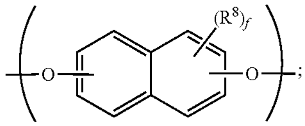

;

$R^6$ is independently fluorine, C1-C4 alkyl group, C1-C4 fluoroalkyl group, C1-C4 fluoroalkoxy group or C1-C4 alkoxy group; e is independently 0, 1, 2, 3 or 4; $R^8$ is independently fluorine, C1-C4 alkyl group, C1-C4 fluoroalkyl group, C1-C4 fluoroalkoxy group or C1-C4 alkoxy group; and, f is independently 0, 1, 2, 3, 4, 5 or 6.

2. The adhesive as claimed in claim 1, wherein the first dianhydride is at least one of dianhydride having a structure represented by Formula (I)

Formula (I)

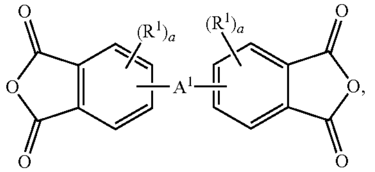

wherein $R^1$ is independently fluorine, C1-C4 alkyl group, C1-C4 fluoroalkyl group, C1-C4 fluoroalkoxy group or C1-C4 alkoxy group; a is independently 0, 1, 2 or 3; $A^1$ is-O-,

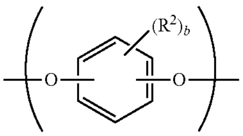
,
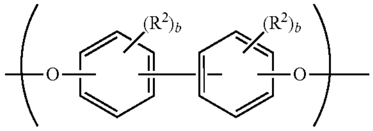
,
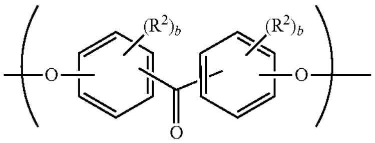
,
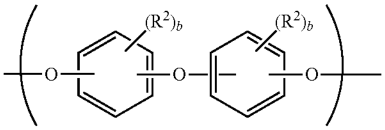
,
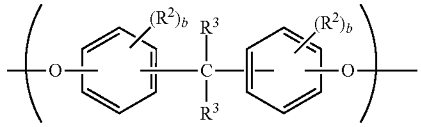
or
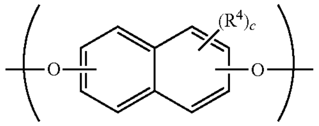
;

$R^2$ is independently fluorine, C1-C4 alkyl group, C1-C4 fluoroalkyl group, C1-C4 fluoroalkoxy group or C1-C4 alkoxy group; b is independently 0, 1, 2, 3 or 4; $R^3$ is independently hydrogen, fluorine, C1-C4 alkyl group, C1-C4 fluoroalkyl group, C1-C4 fluoroalkoxy group or C1-C4 alkoxy group; $R^4$ is independently fluorine, C1-C4 alkyl group, C1-C4 fluoroalkyl group, C1-C4 fluoroalkoxy group or C1-C4 alkoxy group; and, c is independently 0, 1, 2, 3, 4, 5 or 6.

3. The adhesive as claimed in claim 1, wherein the second dianhydride does not consist of cyclobutane-1,2,3,4-tetracarboxylic dianhydride or the second dianhydride does not consist of 1,2,4,5-cyclohexanetetracarboxylic dianhydride.

4. The adhesive as claimed in claim 1, wherein the second dianhydride is bicyclo[2.2.2] oct-7-ene-2,3,5,6-tetracarboxylic dianhydride, bicyclooctane tetracarboxylic dianhydride, dicyclohexyl-3,4,3',4'-tetracarboxylic dianhydride, [3-(carboxymethyl)-1,2,4-cyclopentanetricarboxylic acid 1,4:2,3-dianhydride], 1,2,3,4-butanetetracarboxylic dianhydride, 3,3',4,4'-biphenyl tetracarboylic dianhydride, 2,3,3',4'-biphenyltetracarboxylic dianhydride, 5-[4-(1,3-dioxo-2-benzofuran-5-yl)phenyl]-2-benzofuran-1,3-dione, 5-[3-(1,3-dioxo-2-benzofuran-5-yl)phenyl]-2-benzofuran-1,3-dione, 4,4'-(hexafluoroisopropylidene)diphthalic anhydride, 3,3',4,4'-benzophenonetetracarboxylic dianhydride, 9,9-bis(3,4-dicarboxyphenyl) fluorene dianhydride or a combination thereof.

5. The adhesive as claimed in claim 1, wherein the second diamine does not consist of isophorone diamine, or the second diamine does not consist of 4-methylcyclohexane-1,3-diamine.

6. The adhesive as claimed in claim 1, wherein the second diamine is 4,4'-methylenebis(cyclohexylamine), 4,4'-methylenebis(2-methylcyclohexylamine), bis(aminomethyl) norbornane, adamantane-1,3-diamine, octahydro-4,7-methanoindene-1 (2),5 (6)-dimethanamine, 2,2'-bis (trifluoromethyl)benzidine, 4,4'-diamino-2,2'-dimethylbiphenyl, O-tolidine, 4,4'-methylenedianiline, 3,4'-methylenedianiline, 4,4'-diamino-3,3'-dimethyldiphenylmethane, 4,4'-methylenebis(2-ethylbenzenamine), 4,4'-methylenebis(2,6-diethylaniline), 9,10-bis(4-aminophenyl) anthracene, 2,6-naphthalenediamine, 2,6-anthracenediamine, 4,4''-diamino-p-terphenyl, 2,2-bis(4-aminophenyl) hexafluoropropane, α,α'-bis(4-aminophenyl)-1,4-diisopropylbenzene, 9,9-bis(4-aminophenyl) fluorene, 3,3',5,5'-tetramethylbenzidine, 4,4'-diamino-2,2'-dimethoxybiphenyl, 4,4'-diaminobenzophenone, or a combination thereof.

7. The adhesive as claimed in claim 1, wherein the molar ratio of the reactant (a) to the reactant (b) is 1:1.05 to 1.05:1.

8. The adhesive as claimed in claim 1, wherein the polyimide has a weight average molecular weight of 5,000 g/mol to 3,000,000 g/mol.

9. The adhesive as claimed in claim 1, further comprising:
a solvent, wherein the adhesive has a solid content of 2 wt % to 20 wt %.

10. A multilayer structure, comprising:
a first substrate; and
an adhesive layer disposed on the first substrate, wherein the adhesive layer is a cured product of the adhesive as claimed in claim 1.

11. The multilayer structure as claimed in claim 10, wherein the first substrate is a transparent substrate.

12. The multilayer structure as claimed in claim 10, further comprising:
an electronic element, wherein the adhesive layer disposed between the first substrate and the electronic element.

* * * * *